(12) United States Patent  
Weddle et al.

(10) Patent No.: US 9,245,428 B2  
(45) Date of Patent: Jan. 26, 2016

(54) SYSTEMS AND METHODS FOR HAPTIC REMOTE CONTROL GAMING

(71) Applicant: Immersion Corporation, San Jose, CA (US)

(72) Inventors: Amaya B. Weddle, San Jose, CA (US); Danny Grant, Montreal (CA); David Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 173 days.

(21) Appl. No.: 13/826,391

(22) Filed: Mar. 14, 2013

(65) Prior Publication Data

US 2014/0035736 A1    Feb. 6, 2014

Related U.S. Application Data

(60) Provisional application No. 61/678,908, filed on Aug. 2, 2012, provisional application No. 61/679,382, filed on Aug. 3, 2012.

(51) Int. Cl.
*G06F 3/02* (2006.01)
*G08B 6/00* (2006.01)
*G05D 1/00* (2006.01)

(52) U.S. Cl.
CPC . *G08B 6/00* (2013.01); *G05D 1/005* (2013.01)

(58) Field of Classification Search
CPC ... A63F 2300/1037; G06F 3/016; G08B 6/00; G05D 1/005
USPC ........ 345/156, 168, 169; 340/407.2; 446/454, 446/456
See application file for complete search history.

(56) References Cited

U.S. PATENT DOCUMENTS

| 3,157,853 | A | 11/1964 | Hirsch |
| 3,220,121 | A | 11/1965 | Cutler |
| 3,497,668 | A | 2/1970 | Hirsch |
| 3,517,446 | A | 6/1970 | Corlvon et al. |

(Continued)

FOREIGN PATENT DOCUMENTS

| EP | 0 265 011 | 4/1988 |
| EP | 0 085 518 | 8/1989 |

(Continued)

OTHER PUBLICATIONS

European Patent Office, Partial European Search Report, European Application No. EP13178283, dated Nov. 26, 2013.

(Continued)

*Primary Examiner* — Thomas Mullen
(74) *Attorney, Agent, or Firm* — Kilpatrick Townsend & Stockton LLP

(57) ABSTRACT

Systems and methods for haptic remote control gaming are disclosed. In one embodiment a portable multifunction device receives information from a remotely controllable device. The portable multifunction device can be operable as a remote control for the remotely controllable device. The portable multifunction device may be a smartphone, a tablet computer, or another suitable electronic device. The portable multifunction device can determine a haptic effect based at least in part on the information received from the remotely controllable device. The portable multifunction device may generate a signal configured to cause an actuator to output the determined haptic effect. The portable multifunction device can output the signal.

28 Claims, 7 Drawing Sheets

(56) References Cited

U.S. PATENT DOCUMENTS

| | | | |
|---|---|---|---|
| 3,902,687 | A | 9/1975 | Hightower |
| 3,903,614 | A | 9/1975 | Diamond et al. |
| 3,919,691 | A | 11/1975 | Noll |
| 4,018,121 | A | 4/1977 | Chowning |
| 4,054,749 | A | 10/1977 | Suzuki |
| 4,091,302 | A | 5/1978 | Yamashita |
| 4,160,508 | A | 7/1979 | Salisbury, Jr. et al. |
| 4,236,325 | A | 12/1980 | Hall et al. |
| 4,334,221 | A | 6/1982 | Rosenhagen et al. |
| 4,360,345 | A | 11/1982 | Hon |
| 4,386,346 | A | 5/1983 | Levine |
| 4,414,984 | A | 11/1983 | Zarudiansky |
| 4,430,595 | A | 2/1984 | Nakasone |
| 4,490,810 | A | 12/1984 | Hon |
| 4,513,235 | A | 4/1985 | Acklam et al. |
| 4,581,491 | A | 4/1986 | Boothroyd |
| 4,599,070 | A | 7/1986 | Hladky et al. |
| 4,691,659 | A | 9/1987 | Ito et al. |
| 4,695,266 | A | 9/1987 | Hui |
| 4,706,294 | A | 11/1987 | Ouchida |
| 4,708,656 | A | 11/1987 | DeVries et al. |
| 4,712,101 | A | 12/1987 | Culver |
| 4,713,007 | A | 12/1987 | Alban |
| 4,731,603 | A | 3/1988 | McRae et al. |
| 4,795,296 | A | 1/1989 | Jau |
| 4,823,634 | A | 4/1989 | Culver |
| 4,824,111 | A | 4/1989 | Hoye et al. |
| 4,868,549 | A | 9/1989 | Affinito et al. |
| 4,885,565 | A | 12/1989 | Embach |
| 4,891,764 | A | 1/1990 | Mcintosh |
| 4,907,973 | A | 3/1990 | Hon |
| 4,930,770 | A | 6/1990 | Baker |
| 4,934,694 | A | 6/1990 | Mcintosh |
| 4,938,483 | A | 7/1990 | Yavetz |
| 4,940,234 | A | 7/1990 | Ishida et al. |
| 4,964,837 | A | 10/1990 | Collier |
| 4,983,901 | A | 1/1991 | Lehmer |
| 5,019,761 | A | 5/1991 | Kraft |
| 5,022,407 | A | 6/1991 | Horch et al. |
| 5,024,626 | A | 6/1991 | Nagel |
| 5,035,242 | A | 7/1991 | Franklin |
| 5,038,089 | A | 8/1991 | Szakaly |
| 5,047,918 | A | 9/1991 | Schwartz et al. |
| 5,059,958 | A | 10/1991 | Jacobs et al. |
| 5,078,152 | A | 1/1992 | Bond |
| 5,103,404 | A | 4/1992 | Mcintosh |
| 5,107,262 | A | 4/1992 | Cadoz et al. |
| 5,146,566 | A | 9/1992 | Hollis, Jr. et al. |
| 5,164,530 | A | 11/1992 | Iwase |
| 5,184,319 | A | 2/1993 | Kramer |
| 5,185,561 | A | 2/1993 | Good |
| 5,186,629 | A | 2/1993 | Rohen |
| 5,186,695 | A | 2/1993 | Mangseth et al. |
| 5,189,355 | A | 2/1993 | Larkins |
| 5,191,641 | A | 3/1993 | Yamamoto et al. |
| 5,195,920 | A | 3/1993 | Collier |
| 5,203,563 | A | 4/1993 | Loper, III |
| 5,212,473 | A | 5/1993 | Louis |
| 5,216,337 | A | 6/1993 | Orton et al. |
| 5,220,260 | A | 6/1993 | Schuler |
| 5,240,417 | A | 8/1993 | Smithson et al. |
| 5,271,290 | A | 12/1993 | Fischer |
| 5,273,038 | A | 12/1993 | Beavin |
| 5,275,174 | A | 1/1994 | Cook |
| 5,296,846 | A | 3/1994 | Ledle |
| 5,296,871 | A | 3/1994 | Paley |
| 5,299,810 | A | 4/1994 | Pierce |
| 5,309,140 | A | 5/1994 | Everett |
| 5,334,027 | A | 8/1994 | Wherlock |
| 5,354,162 | A | 10/1994 | Burdea et al. |
| 5,359,527 | A | 10/1994 | Takanabe |
| 5,388,992 | A | 2/1995 | Franklin et al. |
| 5,389,865 | A | 2/1995 | Jacobus et al. |
| 5,399,091 | A | 3/1995 | Mitsumoto |
| 5,405,152 | A | 4/1995 | Katanics et al. |
| 5,436,638 | A | 7/1995 | Bolas et al. |
| 5,440,183 | A | 8/1995 | Denne |
| 5,442,557 | A | 8/1995 | Kaneko |
| 5,459,382 | A | 10/1995 | Jacobus et al. |
| 5,466,213 | A | 11/1995 | Hogan |
| 5,499,360 | A | 3/1996 | Barbara et al. |
| 5,547,382 | A | 8/1996 | Yamasaki |
| 5,559,412 | A | 9/1996 | Schuler |
| 5,565,840 | A | 10/1996 | Thorner et al. |
| 5,572,201 | A | 11/1996 | Graham et al. |
| 5,580,251 | A | 12/1996 | Gilkes et al. |
| 5,583,478 | A | 12/1996 | Renzi |
| 5,587,937 | A | 12/1996 | Massie et al. |
| 5,589,828 | A | 12/1996 | Armstrong |
| 5,614,687 | A | 3/1997 | Yamada et al. |
| 5,619,180 | A | 4/1997 | Massimino et al. |
| 5,629,594 | A | 5/1997 | Jacobus |
| 5,631,861 | A | 5/1997 | Kramer |
| 5,634,051 | A | 5/1997 | Thomson |
| 5,643,087 | A | 7/1997 | Marcus et al. |
| 5,661,446 | A | 8/1997 | Anderson et al. |
| 5,666,138 | A | 9/1997 | Culver |
| 5,669,818 | A | 9/1997 | Thorner et al. |
| 5,684,722 | A | 11/1997 | Thorner et al. |
| 5,692,956 | A | 12/1997 | Rifkin |
| 5,701,140 | A | 12/1997 | Rosenberg |
| 5,704,791 | A | 1/1998 | Gillio |
| 5,709,219 | A | 1/1998 | Chen et al. |
| 5,714,978 | A | 2/1998 | Yamanaka et al. |
| 5,721,566 | A | 2/1998 | Rosenberg et al. |
| 5,724,264 | A | 3/1998 | Rosenberg |
| 5,728,960 | A | 3/1998 | Sitrick |
| 5,731,804 | A | 3/1998 | Rosenberg |
| 5,734,373 | A | 3/1998 | Rosenberg et al. |
| 5,736,978 | A | 4/1998 | Hasser et al. |
| 5,739,811 | A | 4/1998 | Rosenberg et al. |
| 5,742,278 | A | 4/1998 | Chen et al. |
| 5,747,714 | A | 5/1998 | Kniest |
| 5,754,023 | A | 5/1998 | Roston et al. |
| 5,755,577 | A | 5/1998 | Gillio |
| 5,766,016 | A | 6/1998 | Sinclair |
| 5,767,839 | A | 6/1998 | Rosenberg |
| 5,769,640 | A | 6/1998 | Jacobus |
| 5,781,172 | A | 7/1998 | Engel et al. |
| 5,784,052 | A | 7/1998 | Keyson |
| 5,785,630 | A | 7/1998 | Bobick et al. |
| 5,790,108 | A | 8/1998 | Salcudean et al. |
| 5,791,908 | A | 8/1998 | Gillio |
| 5,800,177 | A | 9/1998 | Gillio |
| 5,805,140 | A | 9/1998 | Rosenberg et al. |
| 5,821,920 | A | 10/1998 | Rosenberg |
| 5,825,308 | A | 10/1998 | Rosenberg |
| 5,828,197 | A | 10/1998 | Martin |
| 5,857,939 | A | 1/1999 | Kaufman |
| 5,857,986 | A | 1/1999 | Moriyasu |
| 5,870,740 | A | 2/1999 | Rose |
| 5,874,942 | A | 2/1999 | Walker |
| 5,882,206 | A | 3/1999 | Gillio |
| 5,889,670 | A | 3/1999 | Schuler |
| 5,889,672 | A | 3/1999 | Schuler et al. |
| 5,894,263 | A | 4/1999 | Shimakawa et al. |
| 5,897,437 | A | 4/1999 | Nishiumi et al. |
| 5,914,705 | A | 6/1999 | Johnson et al. |
| 5,928,248 | A | 7/1999 | Acker |
| 5,945,772 | A | 8/1999 | Macnak et al. |
| 5,952,596 | A | 9/1999 | Kondo |
| 5,959,613 | A | 9/1999 | Rosenberg |
| 5,973,670 | A | 10/1999 | Barber et al. |
| 5,984,880 | A | 11/1999 | Lander et al. |
| 5,986,643 | A | 11/1999 | Harvill et al. |
| 6,001,014 | A | 12/1999 | Ogata et al. |
| 6,004,134 | A | 12/1999 | Marcus et al. |
| 6,024,576 | A | 2/2000 | Moore |
| 6,025,790 | A | 2/2000 | Saneyoshi |
| 6,036,495 | A | 3/2000 | Marcus et al. |
| 6,044,646 | A | 4/2000 | Silverbrook |
| 6,078,126 | A | 6/2000 | Rollins et al. |
| 6,088,017 | A | 7/2000 | Tremblay et al. |
| 6,088,019 | A | 7/2000 | Rosenberg |

(56) References Cited

U.S. PATENT DOCUMENTS

| | | |
|---|---|---|
| 6,096,004 A | 8/2000 | Megland |
| 6,104,158 A | 8/2000 | Jacobus et al. |
| 6,106,301 A | 8/2000 | Merril |
| 6,111,577 A | 8/2000 | Zilles et al. |
| 6,113,459 A | 9/2000 | Nammoto |
| 6,119,114 A | 9/2000 | Smadja |
| 6,121,955 A | 9/2000 | Liu |
| 6,122,520 A | 9/2000 | Want |
| 6,154,201 A | 11/2000 | Levin et al. |
| 6,160,489 A | 12/2000 | Perry |
| 6,160,540 A | 12/2000 | Fishkin et al. |
| 6,161,126 A | 12/2000 | Wies et al. |
| 6,163,739 A | 12/2000 | Park et al. |
| 6,184,868 B1 | 2/2001 | Shahoian et al. |
| 6,198,206 B1 | 3/2001 | Saarmaa et al. |
| 6,199,067 B1 | 3/2001 | Geller |
| 6,211,861 B1 | 4/2001 | Rosenberg et al. |
| 6,221,861 B1 | 4/2001 | Seegmiller |
| 6,241,574 B1 | 6/2001 | Helbing |
| 6,244,742 B1 | 6/2001 | Yamada |
| 6,256,011 B1 | 7/2001 | Culver |
| 6,275,213 B1 | 8/2001 | Tremblay et al. |
| 6,280,327 B1 | 8/2001 | Leifer et al. |
| RE37,374 E | 9/2001 | Roston et al. |
| 6,293,798 B1 | 9/2001 | Boyle et al. |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,317,032 B1 | 11/2001 | Oishi |
| 6,323,412 B1 | 11/2001 | Loo |
| 6,346,025 B1 | 2/2002 | Tachau et al. |
| 6,366,272 B1 | 4/2002 | Rosenberg |
| 6,369,952 B1 | 4/2002 | Rallison et al. |
| 6,376,971 B1 | 4/2002 | Pelrine |
| 6,401,027 B1 | 6/2002 | Xu et al. |
| 6,411,896 B1 | 6/2002 | Shuman et al. |
| 6,422,941 B1 | 7/2002 | Thorner |
| 6,424,333 B1 | 7/2002 | Tremblay et al. |
| 6,429,846 B2 | 8/2002 | Rosenberg |
| 6,470,207 B1 | 10/2002 | Simon |
| 6,470,302 B1 | 10/2002 | Cunningham |
| 6,498,982 B2 | 12/2002 | Bellesfield et al. |
| 6,501,420 B2 | 12/2002 | Townsend |
| 6,563,487 B2 | 5/2003 | Martin |
| 6,564,210 B1 | 5/2003 | Korda et al. |
| 6,585,595 B1 | 7/2003 | Soma et al. |
| 6,598,707 B2 | 7/2003 | Nakagaki et al. |
| 6,612,925 B1 | 9/2003 | Forsberg |
| 6,636,835 B2 | 10/2003 | Ragsdale-Elliott et al. |
| 6,640,187 B1 | 10/2003 | Chenault |
| 6,641,480 B2 | 11/2003 | Murzanski et al. |
| 6,646,643 B2 | 11/2003 | Templeman |
| 6,655,817 B2 | 12/2003 | Devlin |
| 6,665,644 B1 | 12/2003 | Kanevsk et al. |
| 6,686,531 B1 | 2/2004 | Pennock et al. |
| 6,686,901 B2 | 2/2004 | Rosenberg |
| 6,686,911 B1 | 2/2004 | Levin |
| 6,694,228 B2 | 2/2004 | Rios |
| 6,697,043 B1 | 2/2004 | Shahoian et al. |
| 6,697,044 B2 | 2/2004 | Shahoian |
| 6,697,715 B1 | 2/2004 | Freeman |
| 6,707,443 B2 | 3/2004 | Bruneau et al. |
| 6,717,573 B1 | 4/2004 | Shahoian et al. |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,749,537 B1 | 6/2004 | Hickman |
| 6,768,066 B2 | 7/2004 | Wehrenberg |
| 6,768,246 B2 | 7/2004 | Pelrine |
| 6,772,026 B2 | 8/2004 | Bradbury et al. |
| 6,778,226 B1 | 8/2004 | Eshelman |
| 6,781,289 B2 | 8/2004 | Heinz et al. |
| 6,801,837 B2 | 10/2004 | Carlstedt et al. |
| 6,804,643 B1 | 10/2004 | Kiss |
| 6,808,472 B1 | 10/2004 | Hickman |
| 6,812,394 B2 | 11/2004 | Weissflog |
| 6,812,624 B1 | 11/2004 | Pei et al. |
| 6,816,711 B2 | 11/2004 | Standke |
| 6,819,267 B1 | 11/2004 | Edmark |
| 6,822,635 B2 | 11/2004 | Shahoian |
| 6,829,599 B2 | 12/2004 | Chidlovskii |
| 6,836,982 B1 | 1/2005 | Augustine |
| 6,857,930 B1 | 2/2005 | Lawley, Jr. |
| 6,858,970 B2 | 2/2005 | Malkin |
| 6,863,220 B2 | 3/2005 | Selker |
| 6,867,733 B2 | 3/2005 | Sandhu |
| 6,871,142 B2 | 3/2005 | Kumada et al. |
| 6,882,086 B2 | 4/2005 | Kornbluh |
| 6,885,362 B2 | 4/2005 | Suomela |
| 6,887,158 B2 | 5/2005 | Goto et al. |
| 6,915,295 B2 | 7/2005 | Okamoto et al. |
| 6,921,351 B1 | 7/2005 | Hickman |
| 6,929,481 B1 | 8/2005 | Alexander |
| 6,956,538 B2 | 10/2005 | Moore |
| 6,963,762 B2 | 11/2005 | Kaaresoja et al. |
| 6,970,088 B2 | 11/2005 | Kovach |
| 6,978,320 B2 | 12/2005 | Nonaka |
| 6,982,697 B2 | 1/2006 | Wilson |
| 6,983,139 B2 | 1/2006 | Dowling et al. |
| 6,985,143 B2 | 1/2006 | Pharr |
| 7,023,423 B2 | 4/2006 | Rosenberg |
| 7,062,367 B2 | 6/2006 | Kim |
| 7,094,153 B2 | 8/2006 | Kunieda et al. |
| 7,100,835 B2 | 9/2006 | Selker |
| 7,127,333 B2 | 10/2006 | Arvidsson |
| 7,137,891 B2 | 11/2006 | Neveu et al. |
| 7,176,893 B1 | 2/2007 | Larkin |
| 7,181,438 B1 | 2/2007 | Szabo |
| 7,235,012 B2 | 6/2007 | DiDato |
| 7,249,126 B1 | 7/2007 | Ginsburg et al. |
| 7,283,997 B1 | 10/2007 | Howard et al. |
| 7,312,766 B1 | 12/2007 | Edwards |
| 7,343,232 B2 | 3/2008 | Duggan et al. |
| 7,402,964 B1 | 7/2008 | Calhoun |
| 7,471,216 B2 | 12/2008 | Chen et al. |
| 7,779,166 B2 | 8/2010 | Grant et al. |
| 2001/0003101 A1 | 6/2001 | Shinohara et al. |
| 2001/0045978 A1 | 11/2001 | McConnell et al. |
| 2002/0016786 A1 | 2/2002 | Pitkow et al. |
| 2002/0030663 A1 | 3/2002 | Tierling et al. |
| 2002/0054060 A1 | 5/2002 | Schena |
| 2002/0078045 A1 | 6/2002 | Dutta |
| 2002/0103025 A1 | 8/2002 | Murzanski et al. |
| 2002/0123988 A1 | 9/2002 | Dean |
| 2002/0133418 A1 | 9/2002 | Hammond et al. |
| 2002/0142701 A1 | 10/2002 | Rosenberg |
| 2002/0177471 A1 | 11/2002 | Kaaresoja et al. |
| 2003/0030619 A1 | 2/2003 | Martin et al. |
| 2003/0033287 A1 | 2/2003 | Shanahan et al. |
| 2003/0060906 A1 | 3/2003 | Kim |
| 2003/0067908 A1 | 4/2003 | Mattaway |
| 2003/0069077 A1 | 4/2003 | Korienek |
| 2003/0110038 A1 | 6/2003 | Sharma |
| 2003/0115193 A1 | 6/2003 | Okamoto et al. |
| 2003/0187837 A1 | 10/2003 | Culiss |
| 2003/0201975 A1 | 10/2003 | Bailey et al. |
| 2003/0210228 A1 | 11/2003 | Ebersole et al. |
| 2004/0015714 A1 | 1/2004 | Abraham et al. |
| 2004/0017482 A1 | 1/2004 | Weitman |
| 2004/0059708 A1 | 3/2004 | Dean |
| 2004/0068486 A1 | 4/2004 | Chidlovskii |
| 2004/0097806 A1 | 5/2004 | Hunter |
| 2004/0103087 A1 | 5/2004 | Mukherjee et al. |
| 2004/0124248 A1 | 7/2004 | Selker |
| 2004/0125120 A1 | 7/2004 | Weiner |
| 2004/0145600 A1 | 7/2004 | Cruz-Hernandez et al. |
| 2004/0164971 A1 | 8/2004 | Hayward |
| 2004/0166937 A1 | 8/2004 | Rothschild |
| 2004/0186824 A1 | 9/2004 | Delic et al. |
| 2004/0224638 A1 | 11/2004 | Fadell |
| 2004/0225519 A1 | 11/2004 | Martin |
| 2004/0225635 A1 | 11/2004 | Toyama |
| 2004/0233161 A1 | 11/2004 | Shahoian et al. |

(56) References Cited

U.S. PATENT DOCUMENTS

| | | | |
|---|---|---|---|
| 2004/0238732 A1 | 12/2004 | State et al. |
| 2005/0032528 A1 | 2/2005 | Dowling et al. |
| 2005/0059489 A1 | 3/2005 | Kim |
| 2005/0060299 A1 | 3/2005 | Filley |
| 2005/0071328 A1 | 3/2005 | Lawrence et al. |
| 2005/0080786 A1 | 4/2005 | Fish |
| 2005/0096047 A1 | 5/2005 | Haberman et al. |
| 2005/0107688 A1 | 5/2005 | Strommer |
| 2005/0114149 A1 | 5/2005 | Rodriguez |
| 2005/0139660 A1 | 6/2005 | Maxymych et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0177614 A1 | 8/2005 | Bourne |
| 2005/0198376 A1 | 9/2005 | Kotzin |
| 2005/0212749 A1 | 9/2005 | Mawit et al. |
| 2005/0222981 A1 | 10/2005 | Lawrence et al. |
| 2005/0222989 A1 | 10/2005 | Haveliwala et al. |
| 2005/0227712 A1 | 10/2005 | Estevez |
| 2005/0277470 A1 | 12/2005 | Watanachote |
| 2005/0278317 A1 | 12/2005 | Gross et al. |
| 2005/0286546 A1 | 12/2005 | Basseli et al. |
| 2006/0015560 A1 | 1/2006 | MacAuley et al. |
| 2006/0017692 A1 | 1/2006 | Wehrenberg et al. |
| 2006/0022955 A1 | 2/2006 | Kennedy |
| 2006/0026521 A1 | 2/2006 | Hotelling et al. |
| 2006/0066569 A1 | 3/2006 | Eid et al. |
| 2006/0095412 A1 | 5/2006 | Zito et al. |
| 2006/0161621 A1 | 7/2006 | Rosenberg |
| 2006/0167576 A1 | 7/2006 | Rosenberg |
| 2006/0167943 A1 | 7/2006 | Rosenberg |
| 2006/0173828 A1 | 8/2006 | Rosenberg |
| 2006/0173837 A1 | 8/2006 | Berstis et al. |
| 2006/0189386 A1 | 8/2006 | Rosenberg |
| 2006/0195361 A1 | 8/2006 | Rosenberg |
| 2006/0223637 A1 | 10/2006 | Rosenberg |
| 2006/0253210 A1 | 11/2006 | Rosenberg |
| 2007/0067294 A1 | 3/2007 | Ward et al. |
| 2007/0125852 A1 | 6/2007 | Rosen berg |
| 2007/0135264 A1 | 6/2007 | Rosenberg |
| 2007/0143625 A1 | 6/2007 | Jung et al. |
| 2007/0156677 A1 | 7/2007 | Szabo |
| 2008/0103639 A1 | 5/2008 | Troy et al. |
| 2008/0300055 A1 | 12/2008 | Lutnick et al. |
| 2009/0289778 A1 | 11/2009 | King |
| 2011/0061017 A1 | 3/2011 | Ullrich et al. |

FOREIGN PATENT DOCUMENTS

| | | |
|---|---|---|
| EP | 0 349 086 | 1/1990 |
| EP | 0 607 580 | 7/1994 |
| EP | 0 626 634 | 11/1994 |
| EP | 0 695 566 | 2/1996 |
| EP | 0 940 162 | 9/1999 |
| EP | 0 977 142 | 2/2000 |
| GB | 2 237 160 | 4/1991 |
| GB | 2 336 890 | 11/1999 |
| JP | H2-185278 | 7/1990 |
| JP | 3033148 | 2/1991 |
| JP | H4-8381 | 1/1992 |
| JP | H5-192449 | 8/1993 |
| JP | 05-300985 | 11/1993 |
| JP | H 05-300985 | 11/1993 |
| JP | 06-039097 | 5/1994 |
| JP | H7-24147 | 1/1995 |
| JP | 07-024708 | 3/1995 |
| JP | 07-019512 | 5/1995 |
| JP | 07-053189 | 6/1995 |
| JP | 07-048297 | 2/1996 |
| JP | H 08-048297 | 2/1996 |
| JP | 08-168545 | 7/1996 |
| JP | 09-138767 | 5/1997 |
| JP | 9-215870 | 8/1997 |
| JP | 10-200882 | 7/1998 |
| JP | 10-314463 | 12/1998 |
| JP | H 11-004966 | 1/1999 |
| JP | H 11-313001 | 11/1999 |
| JP | 2000-020222 | 1/2000 |
| JP | 2000-102677 | 4/2000 |
| JP | 2000-317866 | 11/2000 |
| JP | 2000-334163 | 12/2000 |
| JP | 2001-502200 | 2/2001 |
| JP | 2001-062160 | 3/2001 |
| WO | WO 92/00559 | 1/1992 |
| WO | WO 97/31333 | 8/1997 |
| WO | WO 98/14253 | 4/1998 |
| WO | WO 98/32112 | 7/1998 |
| WO | WO 99/40504 | 8/1999 |
| WO | WO 01/03105 | 1/2001 |
| WO | WO 01/13354 | 2/2001 |
| WO | WO 01/24158 | 4/2001 |
| WO | WO 02/03172 | 1/2002 |
| WO | WO 02/27705 | 4/2002 |

OTHER PUBLICATIONS

Adelstein, "A Virtual Environment System for The Study of Human Arm Tremor," Ph.D. Dissertation, Dept. of Mechanical Engineering, MIT, Jun. 1989.

Adelstein, "Design and Implementation of a Force Reflecting Manipulandum for Manual Control research," DSC-vol. 42, Advances in Robotics, Edited by H. Kazerooni, pp. 1-12, 1992.

Akamatsu, et al., "MultimodalMouse: A Mouse-Type Device with Tactile and Force Display," Presence, vol. 3, No. I, 1994, pp. 73-80•.

Aukstakalnis et al., "Silicon Mirage: The Art and Science of Virtual Reality," ISBN 0-938151-82-7, pp. 129-180, 1992.

Baigrie, "Electric Control Loading: A Low Cost. High Performance Alternative," Proceedings, pp. 247-254, Nov. 6•8, 1990.

Bejczy et al., "A Laboratory Breadboard System for Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of MechanicalEngineers. San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) for Space Telerobots." CH 2413-3/87/0000/0316501.00 1987 IEEE, 1987.

Bejczy, "Generalization of Bilateral Force-Reflecting Control of Manipulators," Proceedings of Fourth CISM• IFToMM, Sep. 8-12, 1981.

Brooks et al., "Hand Controllers for Teleoperation- A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Dennerlein, et al., "Vibrotactile Feedback for Industrial Telemanipulators," ASME IMECE, 6th Annual Symp. On Haptic Interfaces for Virtual Environment and Teleoperator Systems, Nov. 1997, pp. 1-7.

Eberhardt et al., "Including Dynamic Haptic Perception by The Hand: System Description and Some Results," DSC-vol. 55-1, Dynamic Systems and Control: vol. 1, ASME 1994.

Eberhardt et al., "OMAR-A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mices," International Journal of Human-Computer Interaction, vol. 7, No. 1, pp. 1-24, 1995.

(56) References Cited

OTHER PUBLICATIONS

Gotow et al.,"Controlled Impedance Test Apparatus for Studying Human Interpretation of Kinesthetic Feedback," WA11-11:00, pp. 332-337.

Hasser, C. et al., "Tactile Feedback with Adaptive Controller for a Force-Reflecting Haptic Display," Parts 1&2, IEEE 0-7803-3131-1, 1996, pp. 526-533.

Hasser, C., "Force-Reflecting Anthropomorphic Hand Masters," ALICF-TR-1995-0110, 1995, pp. 5-31.

Howe. "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin. "Mouse Ball-Actuating Device With Force and Tactile Feedback," vol. 32, No. 98, Feb. 1990.

Iwata, "Pen-based Haptic Virtual Environment," 0-7803-1363-1/93 IEEE, pp. 287-292,1993.

Jacobsen et at., "High Performance, Dextrous Telerobotic Manipulator With Force Reflection," Intervention/ROV'91 Conference & Exposition, Hollywood, Florida. May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kelley, A. J. et al., "MagicMouse: Tactile and Kinesthetic Feedback in the Human- Computer Interface using an Electromagnetically Acuted Input/Output Device," Dept. of Elec. Eng., Univ. of Brit. Columbia, 1993, pp. 1-27.

Kim, W. "Telemanipulator Technology and Space Telerobotics," SPIE Proceedings, 1993, vol. 2057, pp. 40-50.

Kontarinis et al., "Display of High-Frequency Tactile Information to Teleoperators," Telemanipulator Technology and Space Telerobotics, Won S. Kim, Editior, Proc.SPIE vol. 2057,pp. 40-50, Sep. 7-9, 1993.

MacLean, et al., An Architecture for Haptic Control of Media, In the Proceedings of the ASME Dynamic Systems and Control Division: 1999 International Mechanical Engineering Congress and Exposition Eighth Annual Symposium on Haptic Interfaces for Virtual Environments and Teleoperator Systems Nov. 14-19, 1999, Nashville, TN.

Marcus, "Touch Feedback in Surgery." Proceedings of Virtual Reality and Medicine The Cutting Edge, Sep. 8-11, 1994.

McAffee, "Teleoperator Subsystem/Telerobot Demonsdtrator:Force Reflecting Hand Controller Equipment Manual," JPL D-5172, pp. 1•50, A1-A36, 81-B5, C1-C36, Jan. 1988.

Minsky, Margaret et al., "Feeling and Seeing: Issues in Force Display," ACM 089791-351-5, 1990, pp. 235-242.

Minsky. "Computational Haptics: The Sandpaper System for Synthesizing Texture for a Force-Feedback Display," Ph.D. Dissertation. MIT, Jun. 1995.

Ouh-Young et al., "The Development of A Low-Cost Force Feedback Joystick and Its Use in the Virtual Reality Environment," Proceedings of the Third Pacific Conference on Computer Graphics and Applications. Pacific Graphics '95, Seoul, Korea, Aug. 21-24, 1995.

Ouh-Young, "A Low-Cost Force Feedback Joystick and Its Use in PC Video Games," IEEE Transactions on Consumer Electronics, vol. 41, No. 3, Aug. 1995.

Ouh-young, M. et al., "Creating an Illusion of Feel: Control Issues in Force Display," Computer Science Dept., University of North Carolina, 1989, pp. 1-14.

Ouh-Young,"Force Display in Molecular Docking," Order No. 9034744,p. 1-369, 1990.

Patrick et al., "Design and Testing of A Non-reactive. Fingertip, Tactile Display for Interaction with Remote Environments," Cooperative Intelligent Robotics in Space,Rui J. deFigueiredo et al., Editor, Proc. SPIE vol. 1387, pp. 215-222, 1990.

Pimentel et al., 'Virtual Reality: through the new looking glass, 2'• Edition; McGraw-Hill, ISBN 0-07-050167-X, pp. 41-202, 1994.

Rabinowitz et al.,"Multidimensional tactile displays: Identification of vibratory intensity, frequency, and contactor area," Journal of The Acoustical Society of America, vol. 82, No. 4, Oct. 1987.

Ramstein, C., "Combining Haptic and Braille Technologies: Design Issues and Pilot Study," ASSETS '96, 2nd Annual ACM Conf. on Assistive Technologies, 1996, pp. 37-44.

Russo,"Controlling Dissipative Magnetic Particle Brakes•in Force Reflective Devices," DSC-vol. 42, Advances in Robotics, pp. 63-70, ASME 1992.

Russo, "The Design and Implementation of a Three Degree of Freedom Force Output Joystick," MIT libraries Archives Aug. 14, 1990, pp. 1-131, May 1990.

Scannell. 'Taking a Joystick Ride,' Computer Currents. Boston Edition. vol. 9, No. 11. Nov. 1994.

Schmult et al., "Application Areas for a Force-Feedback Joystick," ASME 1993, DSC-vol. 49,pp. 47-54.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al.,"Model-X Force-Reflecting-Hand-Controller," NT Control No. MP0-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics,pp. 55-61. ASME 1992.

Tadros, "Control System Design for a Three Degree of Freedom Virtual Environment Simulator Using Motor/Brake Pair Actuators", MIT Archive© Massachusetts Institute of Technology, pp. 1-88, Feb. 1990.

Terry et al., "Tactile Feedback in A Computer Mouse," Proceedings of Fourteenth Annual Northeast Bioengineering Conference. University of New Hampshire, Mar. 10•11, 1988.

Patent Cooperation Treaty, International Search Report, International Application No. PCT/US02/10394, date mailed Jul. 3, 2002.

United States Patent and Trademark Office, Office Action, U.S. Appl. No. 09/823,943, mailed May 8, 2013.

United States Patent and Trademark Office, Office Action, U.S. Appl. No. 09/823,943, mailed Aug. 1, 2012.

United States Patent and Trademark Office, Office Action, U.S. Appl. No. 09/823,943, mailed Jan. 26, 2010.

United States Patent and Trademark Office, Office Action, U.S. Appl. No. 09/823,943, mailed Jan. 7, 2009.

United States Patent and Trademark Office, Office Action, U.S. Appl. No. 09/823,943, mailed Jul. 17, 2008.

United States Patent and Trademark Office, Office Action, U.S. Appl. No. 09/823,943, mailed Jan. 11, 2008.

United States Patent and Trademark Office, Office Action, U.S. Appl. No. 09/823,943, mailed Jul. 26, 2007.

United States Patent and Trademark Office, Office Action, U.S. Appl. No. 09/823,943, mailed Oct. 20, 2006.

United States Patent and Trademark Office, Office Action, U.S. Appl. No. 09/823,943, mailed Apr. 20, 2006.

United States Patent and Trademark Office, Office Action, U.S. Appl. No. 09/823,943, mailed Jun. 29, 2005.

United States Patent and Trademark Office, Office Action, U.S. Appl. No. 09/823,943, mailed Jul. 12, 2004.

United States Patent and Trademark Office, Office Action, U.S. Appl. No. 09/823,943, mailed Sep. 13, 2002.

United States Patent and Trademark Office, Office Action, U.S. Appl. No. 09/823,943, mailed Jan. 31, 2002.

Japanese Patent Office, Notice of Reasons for Rejection, Application No. 2002-577071, issued Mar. 4, 2008.

Japanese Patent Office, Notice of Reasons for Rejection, Application No. 2002-577071, issued Jul. 10, 2007.

Japanese Patent Office, Notice of Reasons for Rejection, Application No. 2002-577071, issued Nov. 11, 2008.

Japanese Patent Office, Decision for Rejection, Application No. 2002-577071, issued Jul. 14, 2009.

State Intellectual Property Office of the People's Republic of China, Notification of First Office Action, Application No. 200910165759, issued Sep. 22, 2011.

(56) References Cited

OTHER PUBLICATIONS

Patent Reexamination Board of the Chinese Patent Office, Notification of Reexamination, Application No. 02807519, issued Sep. 27, 2010.
Patent Office of the People's Republic of China, Notification of First Office Action, Application No. 02807519, issued Aug. 18, 2006.
Patent Office of the People's Republic of China, Notification of Second Office Action, Application No. 02807519, issued Mar. 14, 2008.
Patent Office of the People's Republic of China, Notification of Third Office Action, Application No. 02807519, issued Jul. 4, 2008.
Patent Office of the People's Republic of China, Decision of Rejection, Application No. 02807519, issued Apr. 24, 2009.
Korean Intellectual Property Office, Notice of Preliminary Rejection, Application No. 10-2003-7012826, dated Jan. 4, 2008.
Japanese Patent Office, Notice of Reasons for Rejection, Application No. 2009-260496, mailed Oct. 12, 2010.
European Patent Office, Communication, Application No. 02726696, mailed Feb. 22, 2006.
Webster's Third New International Dictionary of the English Language Unabridged, 1965, pp. 1375-1376.
Haptics, web page at http://web.archive.org/web/19991001194232/http://lslwww.epfl.ch/-penha/predoc/vr/haptic.html, as available via the Internet, 1999.
BlueDrone: Android Controlled R/C Car by Stephen Mark—Kickstarter, web page at http://kickstarter.com/projects/1756214656/bluedrone-android-controlled-r-c-car, as available via the Internet and printed Aug. 1, 2013.
nxt-remote-control—NXT Remote Control for Android, web page at hppt://code.google.com/p/nxt-remote-control, as available via the Internet and printed Aug. 1, 2013.
Lego's MINDroid Android app remotely controls Mindstorms NXT robots, web page at http://www.engadget.com/2010/10/12/legos-mindroid-android-app-remotely-controls-minds, as available via the Internet and printed Aug. 7, 2013.
European Patent Office, Extended European Search Report, European Application No. EP13178283, dated Mar. 21, 2014.

SYSTEMS AND METHODS FOR HAPTIC REMOTE CONTROL GAMING

CROSS-REFERENCE TO RELATED APPLICATIONS

This application claims priority to U.S. Provisional Patent Application No. 61/678,908, filed Aug. 2, 2012, entitled "Method and Apparatus for a Haptic Cat," and claims priority to U.S. Provisional Patent Application No. 61/679,382, filed Aug. 3, 2012, entitled "Method and Apparatus for a Haptic Cat," the entirety of both of which are hereby incorporated by reference.

FIELD

The present disclosure relates generally to systems and methods for haptic remote control gaming.

BACKGROUND

A remotely controllable device is typically connected with a remote control through a wireless connection so that an operator can stand in one place and remotely control the operation of the remotely controllable device using the remote control. Some remotely controllable devices include a camera and video data from the camera can be transmitted to the remote control through the wireless connection so that the operator can view the video data on a display associated with the remote control.

SUMMARY

Embodiments provide systems and methods for haptic remote control gaming systems. For example, one disclosed method comprises receiving, by a portable multifunction device, information from a remotely controllable device, the portable multifunction device being operable as a remote control for the remotely controllable device; determining, by the portable multifunction device, a haptic effect based at least in part on the received information; generating, by the portable multifunction device, a signal configured to cause an actuator to output the haptic effect; and outputting, by the first portable multifunction device, the signal. In another embodiment, a computer readable medium comprises program code for causing a processor to perform such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for haptic remote control gaming. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System for Haptic Remote Control Gaming

Figure 1:
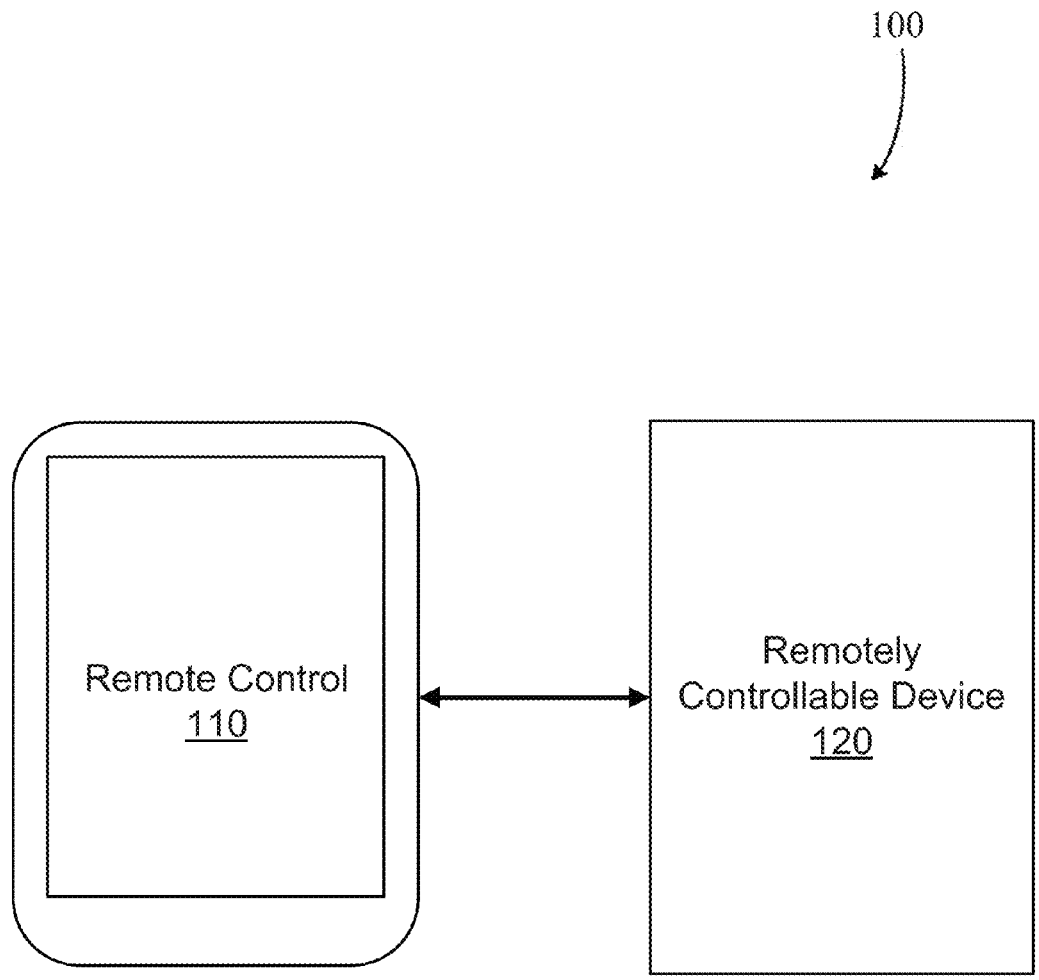
FIG. 1 illustrates a system depicting a remotely controllable device and a remote control in accordance with an embodiment.

Referring now to FIG. 1, FIG. 1 shows an illustrative embodiment of a system 100 for haptic remote control gaming. This illustrative system includes a remote control 110 and a remotely controllable device 120. The remote control 110 is configured to wirelessly control the remotely controllable device. In this embodiment, the remote control 110 is a smartphone that is running a remote control application and the remotely controllable device 120 is a remote-controlled car (or "RC" car). The smartphone displays a number of objects to allow the user to control the RC car, including a throttle, a simulated joystick to turn the car, and a brake pedal. To drive the RC car, the user can touch the throttle and drag it forward or backward to speed up or slow down the RC car. In addition, the user can drag the joystick left or right to turn the RC car, and can press the brake pedal to slow and stop the RC car.

In addition to being able to control the RC car, the smartphone can also receive information from the RC car. For example, in this embodiment, the RC car has multiple collision sensors on it to sense when it collides with an obstacle. It also has a sensor on its roof to sense when the car has rolled over and is no longer drivable. The RC car has a processor that receives signals from the sensors and then is able to use a transmitter also in the RC car to transmit the sensor information back to the smartphone. The smartphone receives the information from the RC car and can output haptic effects to indicate collisions or roll-overs to the user. Thus, the user experiences a more immersive experience when driving the car: the user can feel impacts with obstacles via haptic effects, and can be notified of error conditions, such as when the car has rolled over and needs to be flipped back onto its wheels.

This illustrative example is given to introduce the reader to the general subject matter discussed herein. The disclosure is not limited to this example. The following sections describe various additional non-limiting embodiments and examples of devices, systems, and methods for haptic remote control gaming.

Illustrative Remote Control

Figure 2:
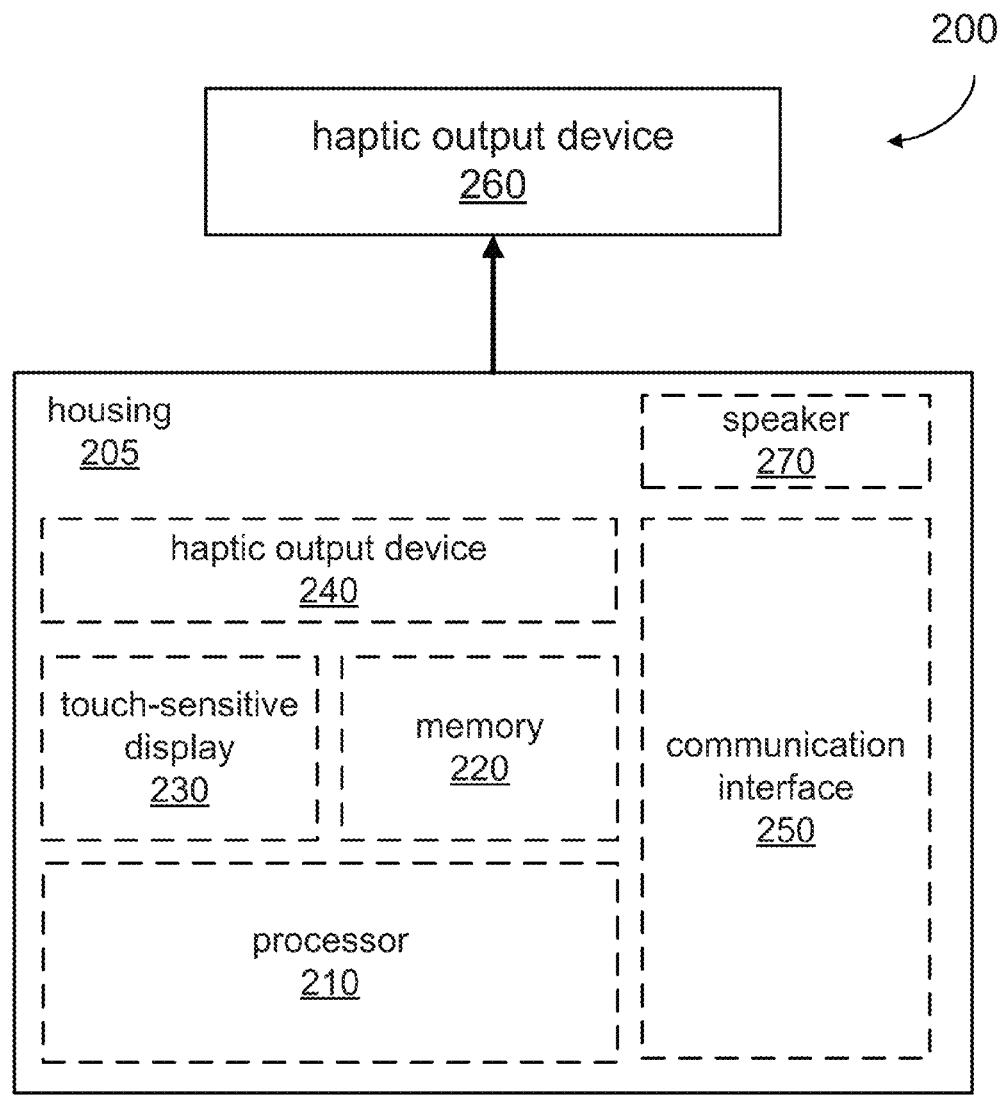
FIG. 2 illustrates a remote control for haptic remote control gaming in accordance with an embodiment.

Referring now to FIG. 2, FIG. 2 illustrates a remote control 200 for haptic remote control gaming in accordance with one embodiment. In the embodiment shown in FIG. 2, the remote control 200 comprises a housing 205, a processor 210, a memory 220, a touch-sensitive display 230, a haptic output device 240, a communication interface 250, and a speaker 270. In addition, the remote control 200 is in communication with haptic output device 260, which may be optionally coupled to or incorporated into some embodiments. The processor 210 is in communication with the memory 220 and, in this embodiment, both the processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the remote control 200. In some embodiments, the touch-sensitive display 230 may not be disposed within the housing 205. For example, the remote control 200 may be connected to or otherwise in communication with a touch-sensitive display 230 disposed within a separate housing. In some embodiment, the housing 205 may comprise two housings that may be slidably coupled to each other, pivotably coupled to each other or releasably coupled to each other.

In the embodiment shown in FIG. 2, the touch-sensitive display 230 is in communication with the processor 210 and is configured to provide signals to the processor 210 or the memory 220 and to receive signals from the processor 210 or memory 220. The memory 220 is configured to store program code or data, or both, for use by the processor 210, which is configured to execute program code stored in memory 220 and to transmit signals to and receive signals from the touch-sensitive display 230. In the embodiment shown in FIG. 2, the processor 210 is also in communication with the communication interface 250 and is configured to receive signals from the communication interface 250 and to output signals to the communication interface 250 to communicate with other components or devices such as one or more remotely controllable devices. In addition, the processor 210 is in communication with haptic output device 240 and haptic output device 260. and is further configured to output signals to cause haptic output device 240 or haptic output device 260, or both, to output one or more haptic effects. Furthermore, the processor 210 is in communication with speaker 270 and is configured to output signals to cause speaker 270 to output sounds. In various embodiments, the remote control 200 may comprise or be in communication with fewer or additional components or devices. For example, other user input devices such as a mouse or a keyboard, or both, may be comprised within the remote control 200 or be in communication with the remote control 200. As another example, remote control 200 may comprise and/or be in communication with one or more accelerometers, gyroscopes, digital compasses, and/or other sensors. A detailed description of the components of the remote control 200 shown in FIG. 2 and components that may be in association with the remote control 200 are described herein.

The remote control 200 can be any device that is capable of receiving user input and communicating with a remotely controllable device. For example, the remote control 200 in FIG. 2 includes a touch-sensitive display 230 that comprises a touch-sensitive surface. In some embodiments, a touch-sensitive surface may be overlaid on the touch-sensitive display 230. In other embodiments, the remote control 200 may comprise or be in communication with a display and a separate touch-sensitive surface. In still other embodiments, the remote control 200 may comprise or be in communication with a display and may comprise or be in communication with other user input devices, such as a mouse, a keyboard, buttons, knobs, slider controls, switches, wheels, rollers, joysticks, other manipulanda, or a combination thereof.

In some embodiments, one or more touch-sensitive surfaces may be included on or disposed within one or more sides of the remote control 200. For example, in one embodiment, a touch-sensitive surface is disposed within or comprises a rear surface of the remote control 200. In another embodiment, a first touch-sensitive surface is disposed within or comprises a rear surface of the remote control 200 and a second touch-sensitive surface is disposed within or comprises a side surface of the remote control 200. In some embodiments, the remote control device may comprise two or more housing components, such as in a clamshell arrangement or in a slideable arrangement. For example, one embodiment comprises a remote control device having a clamshell configuration with a touch-sensitive display disposed in each of the portions of the clamshell. Furthermore, in embodiments where the remote control 200 comprises at least one touch-sensitive surface on one or more sides of the remote control 200 or in embodiments where the remote control 200 is in communication with an external touch-sensitive surface, the display 230 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the remote control 200 may comprise both flexible and rigid touch-sensitive surfaces.

In various embodiments, the remote control 200 may comprise or be in communication with fewer or additional components than the embodiment shown in FIG. 2. For example, in one embodiment, the remote control 200 does not comprise a speaker 270. In another embodiment, the remote control 200 does not comprise a touch-sensitive display 230, but comprises a touch-sensitive surface and is in communication with a display. In other embodiments, the remote control 200 may not comprise or be in communication with a haptic output device 240, 260 at all. Thus, in various embodiments, the remote control 200 may comprise or be in communication with any number of components, such as in the various embodiments disclosed herein as well as variations that would be apparent to one of skill in the art.

The housing 205 of the remote control 200 shown in FIG. 2 provides protection for at least some of the components remote control 200. For example, the housing 205 may be a plastic casing that protects the processor 210 and memory 220 from foreign articles such as rain. In some embodiments, the housing 205 protects the components in the housing 205 from damage if the remote control 200 is dropped by a user. The housing 205 can be made of any suitable material including but not limited to plastics, rubbers, or metals. Various embodiments may comprise different types of housings or a plurality of housings. For example, in some embodiments, the remote control 200 may be a portable device, handheld device, toy, gaming console, handheld video game system, gamepad, game controller, desktop computer, portable multifunction device such as a cell phone, smartphone, personal digital assistant (PDA), laptop, tablet computer, digital music player, etc. In other embodiments, the remote control 200 may be embedded in another device such as a wrist watch, other jewelry, gloves, etc. Thus, in embodiments, the remote control 200 is wearable.

In the embodiment shown in FIG. 2, the touch-sensitive display 230 provides a mechanism to allow a user to interact with the remote control 200. For example, the touch-sensitive display 230 detects the location or pressure, or both, of a user's finger in response to a user hovering over, touching, or pressing the touch-sensitive display 230 (all of which may be referred to as a contact in this disclosure). In one embodiment, a contact can occur through the use of a camera. For example, a camera may be used to track a viewer's eye movements as the user views the content displayed on the display 230 of the remote control 200, or the user's eye movements may be used to transmit commands to the remotely controlled device, such as to change direction or to aim a weapon at a target. In this embodiment, haptic effects may be triggered based at least in part on the viewer's eye movements. For example, a haptic effect may be output when a determination is made that the viewer is viewing content at a particular location of the display 230. In some embodiments, the touch-sensitive display 230 may comprise, be connected with, or otherwise be in communication with one or more sensors that determine the location, pressure, a size of a contact patch, or any of these, of one or more contacts on the touch-sensitive display 230. For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on a touch-sensitive surface such as, for example, resistive, capacitive, infrared, optical, thermal, dispersive signal, or acoustic pulse technologies, or a combination thereof.

In the embodiment shown in FIG. 2, haptic output devices 240 and 260 are in communication with the processor 210 and are configured to provide one or more haptic effects. For example, in one embodiment, when an actuation signal is provided to haptic output device 240, haptic output device 260, or both, by the processor 210, the respective haptic output device(s) 240, 260 outputs a haptic effect based on the actuation signal. For example, in the embodiment shown in FIG. 2, the processor 210 is configured to transmit a haptic output signal to haptic output device 240 comprising an analog drive signal. However, the processor 210 is configured to transmit a command to haptic output device 260, wherein the command includes parameters to be used to generate an appropriate drive signal to cause the haptic output device 260 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 240 or 260, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire remote control or to only one surface or a limited part of the remote control. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. U.S. patent application Ser. No. 13/092,484 describes ways that one or more haptic effects can be produced and describes various haptic output devices. The entirety of U.S. patent application Ser. No. 13/092,484, filed Apr. 22, 2011, is hereby incorporated by reference.

In FIG. 2, the communication interface 250 is in communication with the processor 210 and provides wired or wireless communications, from the remote control 200 to other components or other devices. For example, the communication interface 250 may provide wireless communications between the remote control 200 and a remotely controllable device. In some embodiments, the communication interface 250 may provide communications to one or more other devices, such as another remote control 200 and/or one or more remotely controllable devices, to allow users to interact with each other at their respective devices. The communication interface 250 can be any component or collection of components that enables the remote control 200 to communicate with another component or device. For example, the communication interface 250 may comprise a PCI communication adapter, a USB network adapter, or an Ethernet adapter. The communication interface 250 may communicate using wireless Ethernet, including 802.11 a, g, b, or n standards. In one embodiment, the communication interface 250 can communicate using Radio Frequency (RF), Bluetooth, CDMA, TDMA, FDMA, GSM, WiFi, satellite, or other cellular or wireless technology. In other embodiments, the communication interface 250 may communicate through a wired connection and may be in communication with one or more networks, such as Ethernet, token ring, USB, FireWire 1394, fiber optic, etc. In some embodiments, remote control 200 comprises a single communication interface 250. In other embodiments, remote control 200 comprises two, three, four, or more communication interfaces. Thus, in embodiments, remote control 200 can communicate with one or more remotely controllable devices through one or more communication interfaces and/or can communicate with one or more other remote controls through one or more communication interfaces.

Illustrative Remotely Controllable Device

Figure 3:
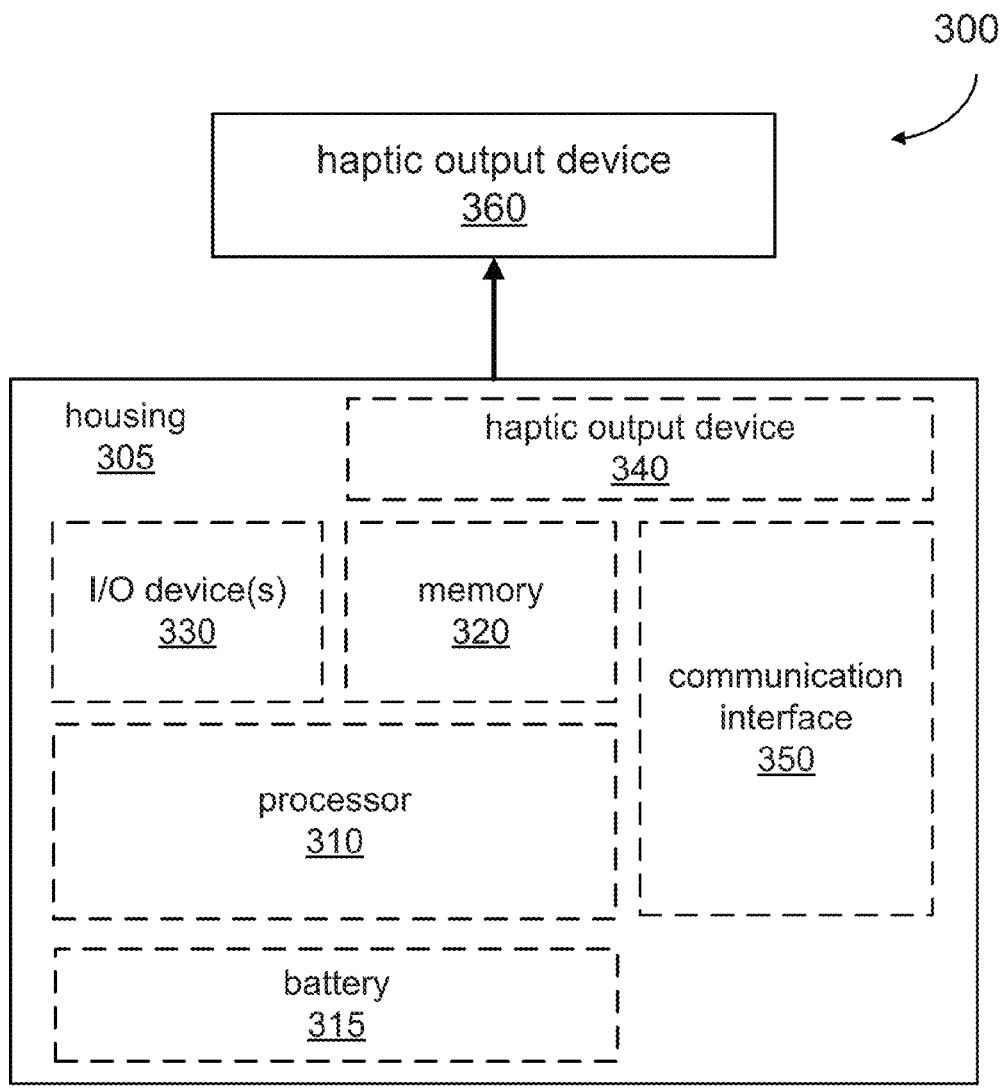
FIG. 3 illustrates a remotely controllable device for haptic remote control gaming in accordance with an illustrative embodiment.

Referring now to FIG. 3, FIG. 3 illustrates a remotely controllable device 300 for haptic remote control gaming in accordance with one embodiment. In the embodiment shown in FIG. 3, the remotely controllable device 300 comprises a housing 305, a processor 310, a battery 315, a memory 320, input and/or output devices 330, a haptic output device 340, and a communication interface 350. In addition, the remotely controlled device 300 is in communication with haptic output device 360, which may be optionally coupled to or incorporated into some embodiments. The processor 310 is in communication with the memory and, in this embodiment, both the processor 310 and the memory 320 are disposed within the housing 305. The input and/or output device 330 shown in FIG. 3 are disposed within the housing 305. In some embodiments, one or more of input and/or output devices 330 may not be disposed within the housing 305. For example, the remotely controllable device 300 may be connected to or otherwise in communication with one or more input and/or output devices 330 disposed within a separate housing.

In the embodiment shown in FIG. 3, the battery 315 provides power to various components of the remotely controllable device 300 such as processor 310, memory 320, I/O device(s) 330, haptic output device 340, communication interface 350, haptic output device 360, or a combination thereof. While one battery is shown in FIG. 3, one or more batteries may be employed. Further, in some embodiments, battery 315 may be disposed within the housing or may be otherwise connected to the remotely-controllable device. In embodiments, status information regarding one or more batteries of a remotely controllable device 300 is sent to at least one remote control and the remote control(s) can provide haptic, visual, and/or auditory cues to a user of a remote control indicating a status of a battery in the remotely controllable device 300. For example, if a battery of a remotely controllable device 300 has a remaining power level below a specified threshold, then a remote control 200 that is in communication with remotely controllable device 300 may output a haptic effect configured to indicate that the remotely controllable device 300 needs to be charged and/or that the battery needs to be replaced. In another embodiment, a warning sound is played by the remote control 200 when the battery level of a remotely controllable device 300 is below a predetermined percentage level. In one embodiment, a percentage of remaining battery life of a remotely controllable device 300 is displayed on a display of a remote control 200. Numerous other embodiments are disclosed herein and variations are within the scope of this disclosure.

In the embodiment shown in FIG. 3, the input and/or output device(s) 330 are in communication with the processor 310 and are configured to provide signals to the processor 310 or the memory 320. The memory 320 stores program code or data, or both, for use by the processor 310 and the processor 310 executes program code stored in memory 320 and receives signals from the input and/or output devices 330. An input and/or output device 330 can include any number of suitable devices such as a camera, an accelerometer, a gyroscope, digital compass, microphone, weapon, wind speed sensor, depth sensor, speed sensor, velocity sensor, temperature sensor, force sensor, collusion detection sensor, and/or other sensors. In various embodiments, one or more sensors can include an optical sensor, a mechanical contact sensor, a magnetic sensor, a potentiometer, and/or any other suitable sensor.

In the embodiment shown in FIG. 3, the processor 310 is in communication with the communication interface 350 and is configured to receive signals from the communication interface 350 and to output signals to the communication interface 350 to communicate with other components or devices. In addition, the processor 310 is in communication with haptic output device 340 and haptic output device 360 and is further configured to output signals to cause haptic output device 340 or haptic output device 360, or both, to output one or more haptic effects. In various embodiments, the remotely controllable device 300 may comprise or be in communication with fewer or additional components or devices. For example, other input devices such as a camera or a microphone, or both, may be comprised within the remotely controllable device 300 or be in communication with the remotely controllable device 300. A detailed description of the components of the remotely controllable device 300 shown in FIG. 3 and components that may be in association with the remotely controllable device 300 are described herein.

The remotely controllable device 300 can be any device that is capable of communicating with a remote control such as remote control 200 shown in FIG. 2. In one embodiment, remotely controllable device 300 is a remotely controllable toy such as a remote control car or a remote control plane. In other embodiments, remotely controllable device 300 may be a drone, unmanned vehicle, unmanned aircraft, doll, robot, toy, and/or any other suitable device that can be controlled with a remote control, such as remote control 200 shown in FIG. 2.

In various embodiments, the remotely controllable device 300 may comprise or be in communication with fewer or additional components than the embodiment shown in FIG. 3. For example, in one embodiment, the remotely controllable device 300 does not comprise haptic output device 340. In other embodiments, the remotely controllable device 300 may not comprise or be in communication with a haptic output device at all. Thus, in various embodiments, the remotely controllable device 300 may comprise or be in communication with any number of components, such as in the various embodiments disclosed herein as well as variations that would be apparent to one of skill in the art.

The housing 305 of the remotely controllable device 300 shown in FIG. 3 provides protection for at least some of the components remotely controllable device 300. For example, the housing 305 may be a plastic casing that protects the processor 310 and memory 320 from foreign articles such as rain. In some embodiments, the housing 305 protects the components in the housing 305 from damage if the remotely controllable device 300 is dropped by a user. The housing 305 can be made of any suitable material including but not limited to plastics, rubbers, or metals. Various embodiments may comprise different types of housings or a plurality of housings. For example, in some embodiments, the remotely controllable device 300 may be a drone, unmanned vehicle, unmanned aircraft, doll, robot, car plane, helicopter, boat, toy, and/or any other suitable device that can be controlled with a remote control, such as remote control 200 shown in FIG. 2.

In the embodiment shown in FIG. 3, the input and/or output devices 330 provides a mechanism for the remotely controllable device 300 to receive information. For example, if the remotely controllable device 300 comprises a temperature sensor, then the sensor can provide information such as the temperature of one or more components within the remotely controllable device 300 or the outside temperature or another temperature external to the remotely controllable device 300. As another example, a remotely controllable device 300 that comprises a contact sensor may be able to detect when a collision with an object such as a rock, other terrain, and/or other remotely controllable devices. In some embodiments, the input and/or output devices 330 may comprise, be connected with, or otherwise be in communication with one or more sensors that determine the location, pressure, a size of a contact patch, or any of these, of one or more contacts on the input and/or output devices 330. For example, in one embodiment, the input and/or output devices 330 comprises or is in communication with a mutual capacitance system. In another embodiment, the input and/or output devices 330 comprises or is in communication with an absolute capacitance system. In some embodiments, the input and/or output devices 330 may comprise or be in communication with a resistive panel, a capacitive panel, infrared LEDs, photodetectors, image sensors, optical cameras, or a combination thereof. Thus, the input and/or output devices 330 may incorporate any suitable technology to determine a contact on a touch-sensitive surface such as, for example, resistive, capacitive, infrared, optical, thermal, dispersive signal, or acoustic pulse technologies, or a combination thereof.

In the embodiment shown in FIG. 3, haptic output devices 340 and 360 are in communication with the processor 310 and are configured to provide one or more haptic effects. For example, in one embodiment, when an actuation signal is provided to haptic output device 340, haptic output device 360, or both, by the processor 310, the respective haptic output device(s) 340, 360 outputs a haptic effect based on the actuation signal. For example, in the embodiment shown in FIG. 3, the processor 310 is configured to transmit a haptic output signal to haptic output device 340 comprising an analog drive signal. However, the processor 310 is configured to transmit a command to haptic output device 360, wherein the command includes parameters to be used to generate an appropriate drive signal to cause the haptic output device 360 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven. A haptic output device, such as haptic output devices 340 or 360, can be any component or collection of components that is capable of outputting one or more haptic effects. Numerous examples of haptic output devices are disclosed above and variations are within the scope of this disclosure.

In one embodiment, haptic output device 340 and/or haptic output device 360 provides status information regarding the remotely controllable device 300. For example, in one embodiment, the remotely controllable device 300 is a passenger vehicle and a haptic effect is output by haptic output device 340 and/or haptic output device 360 when the battery 315 of the vehicle is below a threshold level. As another example, in one embodiment, the remotely controllable device 300 comprises a stuffed animal, doll, or similar toy. In one such embodiment, a user of remote control 200 could send a hug and/or a kiss to a user of the stuffed animal. For example, a parent may be able to use a mobile phone to send a hug and/or a kiss to a child holding the stuffed animal. The stuffed animal can receive the hug and/or the kiss and output one or more haptic effects indicating that a hug and/or kiss has been received. In another embodiment, haptic output device 340 and/or haptic output device 360 provides cues from one or more remote controls. For example, if one remote control cedes control of the remotely controllable device to another remote control, then haptic output device 340 and/or haptic output device 360 can output a haptic effect configured to indicate to a passenger of the remotely controllable device 300 that a new remote control is now controlling the remotely controllable device 300. As shown in FIG. 3, haptic output device 360 may be coupled to or otherwise in communication with the remotely controllable device 300. In other embodiments, haptic output device 360 is inside the remotely controllable device 300. In yet other embodiments, another haptic output device, such as haptic output device 260 shown in FIG. 2, is inside the remotely controllable device 300 and/or coupled to or otherwise in communication with remotely controllable device 300. Numerous other embodiments are disclosed above and variations are within the scope of this disclosure.

In FIG. 3, the communication interface 350 is in communication with the processor 310 and provides wired or wireless communications, from the remotely controllable device 300 to other components or other devices such as remote control 200 shown in FIG. 2. For example, the communication interface 350 may provide wireless communications between the remotely controllable device 300 and remote control 200. In embodiments the communication interface 350 is capable of receiving commands from remote control 200 shown in FIG. 2. Numerous examples of suitable communication interfaces are described above and variations are within the scope of this disclosure.

Illustrative Systems

Figure 4:
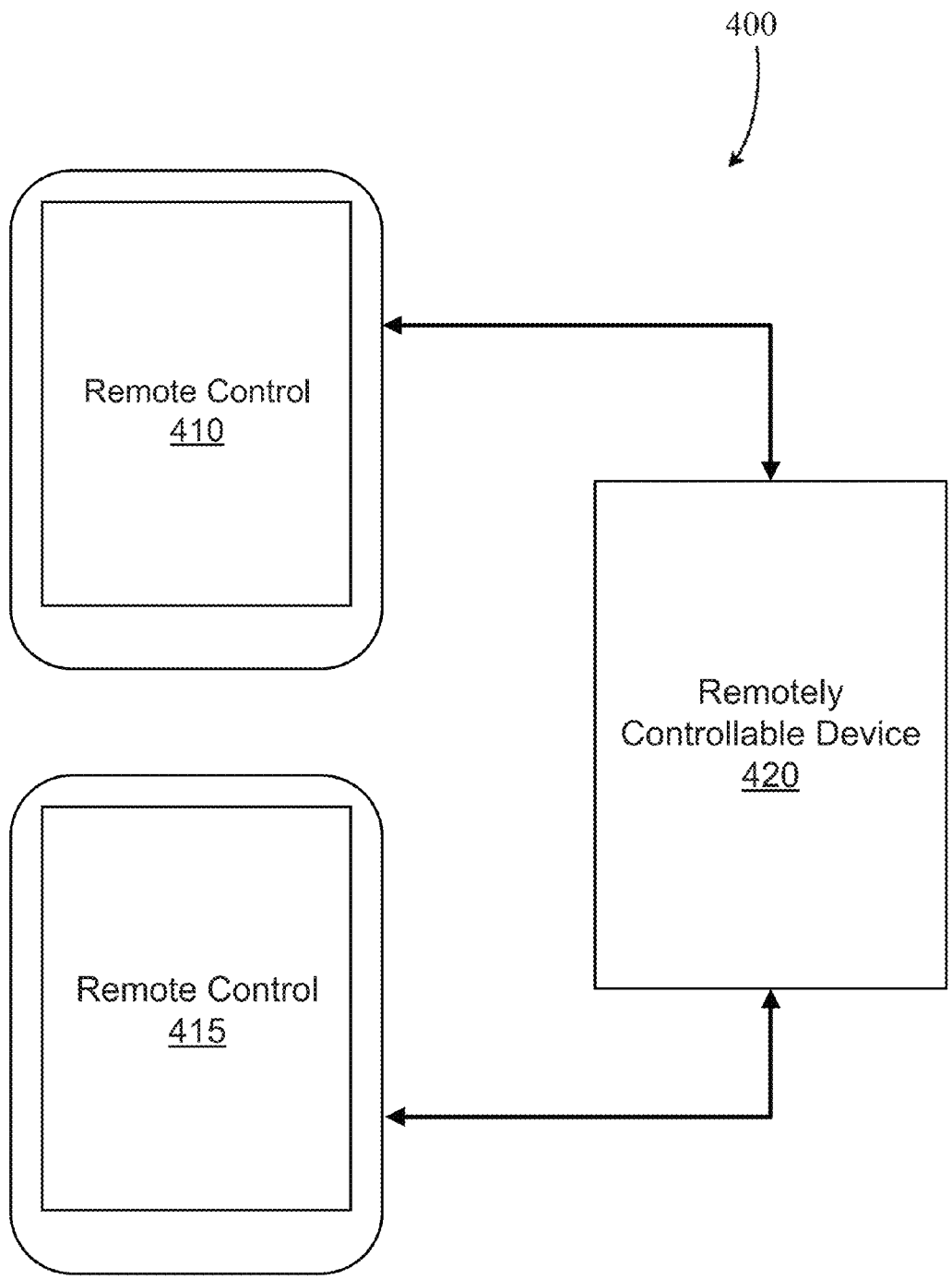
FIG. 4 illustrates a system depicting illustrative devices for haptic remote control gaming in an illustrative computing environment in accordance with an embodiment.

Referring now to FIG. 4, FIG. 4 illustrates a system 400 depicting a remotely controllable device 420 and remote controls 410, 415 in accordance with an embodiment. The system 400 shown in FIG. 4 includes a remotely controllable device

420, a first remote control 410, and a second remote control 415. A remote control, such as remote control 410 and/or remote control 415, can be any suitable device such as remote control 200 discussed herein with respect to FIG. 2. A remotely controllable device, such as remotely controllable device 420, may be any suitable device such as remotely controllable device 300 discussed herein with respect to FIG. 3. In the embodiment shown in FIG. 4, the first remote control 410 is in communication with remotely controllable device 420 and the second remote control 415 is in communication with remotely controllable device 420. In some embodiments, the first remote control 410 may be in communication with the second remote control 415.

One or more remote controls may control or otherwise operate a remotely controllable device. For example, in one embodiment, remote control 410 may control remotely controllable device 420. In this embodiment, remote control 410 may cede control of the remotely controllable device 420 to remote control 415 in response to receiving a request from remote control 415 and/or remotely controllable device 420. In some embodiments, remote control 410 cedes control to remote control 415 in response to an event. For example, if a particular round in a game being played for a user of remote control 410 ends, then remote control 410 may cede control of the remotely controllable device 420 to remote control 415 such that a user of remote control 415 can play the game. As another example, if remotely controllable device 420 receives too much damage while being controlled by remote control 410, then control may be switched to remote control 415. In other embodiments, if remotely controllable device 420 is involved in a predetermined number of crashes within a predetermined period of time while being controlled by remote control 410, then remote control 410 cedes control of the remotely controllable device 420 to remote control 415. Numerous other embodiments are disclosed herein and variations are within the scope of this disclosure.

In embodiments, only one remote control controls the remotely controllable device 420 at a time, but at various times different remote controls can control the remotely controllable device 420. In other embodiments, two or more remote controls may control a remotely controllable device 420 at the same time. For example, remote control 410 may control the direction (e.g., forward, backward, left, right, etc.) of the remotely controllable device 420 while remote control 415 may control the speed of the remotely controllable device 420. As another example, remote control 410 may control the direction and speed of the remotely controllable device 420 while remote control 420 controls the use of a real or a simulated weapon associated with the remotely controllable device 420. In yet another example, remote control 410 may control the driving of a remotely controllable device 420 while remote control 420 controls taking pictures with a camera of the remotely controllable device 420. Thus, in embodiments, operation of a remotely controllable device 420 may be shared by two, three, four, or more remote controls.

In the embodiment shown in FIG. 4, remotely controllable device 420 wirelessly communicates with remote control 410 and remote control 415 through direct wireless connections. In other embodiments, one or more remote controls and/or remotely controllable devices may be in communication through one or more networks. A network may be any suitable number or type of networks or links, including, but not limited to, a dial-in network, a local area network (LAN), wide area network (WAN), public switched telephone network (PSTN), a cellular network, a WiFi network, a satellite network, the Internet, an intranet or any combination of hardwired and/or wireless communication links. In one embodiment, the network is a single network. In other embodiments, the network may comprise two or more networks. For example, the remote control 410 may be connected to a first network and remote control 415 may be connected to a second network and remotely controllable device may be connected to the first network and the second network. In embodiments, remote controls, remotely controlled devices, and/or other devices may communicate with one or more networks over a wireless communications means using Radio Frequency (RF), Bluetooth, CDMA, TDMA, FDMA, GSM, WiFi, satellite, or other cellular or wireless technology. Numerous other network configurations would be obvious to a person of ordinary skill in the art.

In one embodiment, remotely controllable device 420 is a helicopter and comprises a camera. In this embodiment, remote control 410 controls the flying of the helicopter and remote control 415 controls the camera. For example, remote control 410 may be able to control the speed of a propeller of the helicopter and the direction that the helicopter is travelling. Remote control 415 can rotate the camera to view different locations from the helicopter and can take pictures with the camera. As a user of remote control 410 and/or a user of remote control 415 interacts with the remote control(s) to control the helicopter, remote control 410 and/or remote control 415 may output haptic effects to provide the user(s) cues regarding various events. For example, if the helicopter crashes, then remote control 410 and/or remote control 415 can output a haptic effect to indicate that a crash has occurred. As another example, if the speed of the propeller is below a predetermined threshold necessary to sustain lift, then remote control 410 and/or remote control 415 may output a haptic effect indicating that the speed of the propeller needs to be increased. In one embodiment, if the helicopter travels above a certain altitude, then remote control 410 and/or remote control 415 outputs a haptic effect indicating that the altitude of the helicopter needs to be lowered. In another embodiment, remote control 410 and/or remote control 415 outputs a haptic effect when the user of remote control 415 takes a picture with the camera.

In some embodiments, the helicopter is flown outside and various haptic effects, such as those discussed herein, are output in response to events within and/or interactions between the helicopter and the outside environment. For example, a haptic effect may be output when the helicopter is actually flown above a certain altitude outside. As another example, a haptic effect may be output if the helicopter physically crashes into the ground. In other embodiments, various haptic effects are output in response to events with and/or interactions between the helicopter and an augmented environment. For example, a haptic effect may be output when the helicopter is flown above a certain altitude within the augmented environment regardless of the actual physical altitude that the helicopter is actually flying. As another example, a haptic effect may be output when the helicopter crashes into a virtual mountain shown on a display of remote control 410 and/or remote control 415, regardless of whether the helicopter physically crashes into an object in reality. As described herein, remote control 410, remote control 415, and/or remotely controllable device 420 can be used in a real environment, in a virtual reality environment, and/or in an augmented reality. Numerous other embodiments are disclosed herein and variations are within the scope of this disclosure.

In one embodiment, remotely controllable device 420 is a vehicle and comprises multiple gun turrets. In this embodiment, remote control 410 controls a first gun turret and remote control 420 controls a second gun turret. As a user of remote control 410 and/or a user of remote control 415 interacts with the remote control(s) to control their respective gun turret, remote control 410, remote control 415, and/or remotely controllable device 420 may output haptic effects to provide the user(s) and/or passenger(s) cues regarding various events. For example, the vehicle may output a haptic effect indicating that a gun has been fired when the first gun turret and/or the second gun turret is fired. As another example, remote control 410 can output a haptic effect when the first gun turret is fired and remote control 415 can output a haptic effect when the second gun turret is fired. In one embodiment, remote control 410 outputs a haptic effect when the second gun turret is fired and remote control 415 outputs a haptic effect when the first gun turret is fired.

In some embodiments, the vehicle is driven on a road or through terrain outside and various haptic effects, such as those discussed herein, are output in response to events within and/or interactions between the vehicle and the outside environment. For example, a haptic effect may be output when the vehicle is driven into an object, such as a rock. As another example, a haptic effect may be output may be output when the first gun turret and/or the second gun turret in the vehicle is actually, physically fired. In other embodiments, various haptic effects are output in response to sensed events with and/or sensed interactions between the vehicle and an augmented environment. For example, a haptic effect may be output when the vehicle is driven into a virtual rock shown on a display of remote control 410 and/or remote control 415, regardless of whether the vehicle actually is driven into a physical rock. As another example, a haptic effect may be output when the first gun turret and/or the second gun turret is virtually fired in an augmented reality, regardless of whether the first gun turret and/or the second gun turret is actually fired in reality. As described herein, remote control 410, remote control 415, and/or remotely controllable device 420 can be used in a real environment, in a virtual reality environment, and/or in an augmented reality. Numerous other embodiments are disclosed herein and variations are within the scope of this disclosure.

In another embodiment, remotely controllable device 420 comprises a stuffed animal, doll, or similar toy. In one such embodiment, a user such as a parent can control a stuffed animal using remote control 415. For example, a user may be able to use a smartphone to control the stuffed animal. In this embodiment, the user of the smartphone can send messages to a user of the stuffed animal which are output as haptic effects. For example, a parent using a smartphone or other suitable remote control 415 can send a hug or a kiss to a user (such as a child) holding or otherwise contacting the remotely controllable device 420. Thus, if the remotely controllable device 420 is a stuffed animal, then the stuffed animal can receive the message from the smartphone and output a haptic effect configured to indicate that a message (such as a kiss or a hug) has been received. If the child is holding the stuffed animal, then the child may feel the haptic effects output by the stuffed animal and know that he or she has been sent a hug and/or a kiss. In some embodiments, the stuffed animal or other toy may also transmit haptic messages back to the remote control device, such as to indicate that the hug or kiss is being received. In other embodiments, the remotely controllable device may be a robotic toy or any other suitable remotely controllable device. Numerous other embodiments are disclosed herein and variations are within the scope of this disclosure.

As another example, remotely controllable device 420 may be a stuffed animal, such as a cat. In one embodiment, remote control 410 comprises an application having a graphical user interface including an image of an animal corresponding to the stuffed animal. For example, if the stuffed animal is a cat, then the graphical user interface on the remote control 410 may display an image of a cat. In one embodiment, as a user interacts with the image of the cat displayed on the remote control 410, one or more haptic effects are output by the remotely controllable device 420. For example, if the remote control 410 comprises a touchscreen display, and a user of the remote control 410 pets the image of the cat displayed on the touchscreen display, then the remotely controllable device 420 (e.g., cat) may output a haptic effect that feels like a purr. In some embodiments, the remote control 410 may output a haptic effect that feels like a purr when a user of the remote control 410 pets the image of the cat displayed on the touchscreen display. In another embodiment, one or more haptic effects may be output by remote control 410 when a user interacts with the remotely controllable device 420 (e.g., cat). For example, as a user pets the cat, remote control 410 may output a haptic effect that feels like a purr. In some embodiments, the remotely controllable device 420 may output a haptic effect that feels like a purr when a user of the remotely controllable device 420 pets the cat. Numerous other embodiments are disclosed herein and variations are within the scope of this disclosure.

Figure 5:
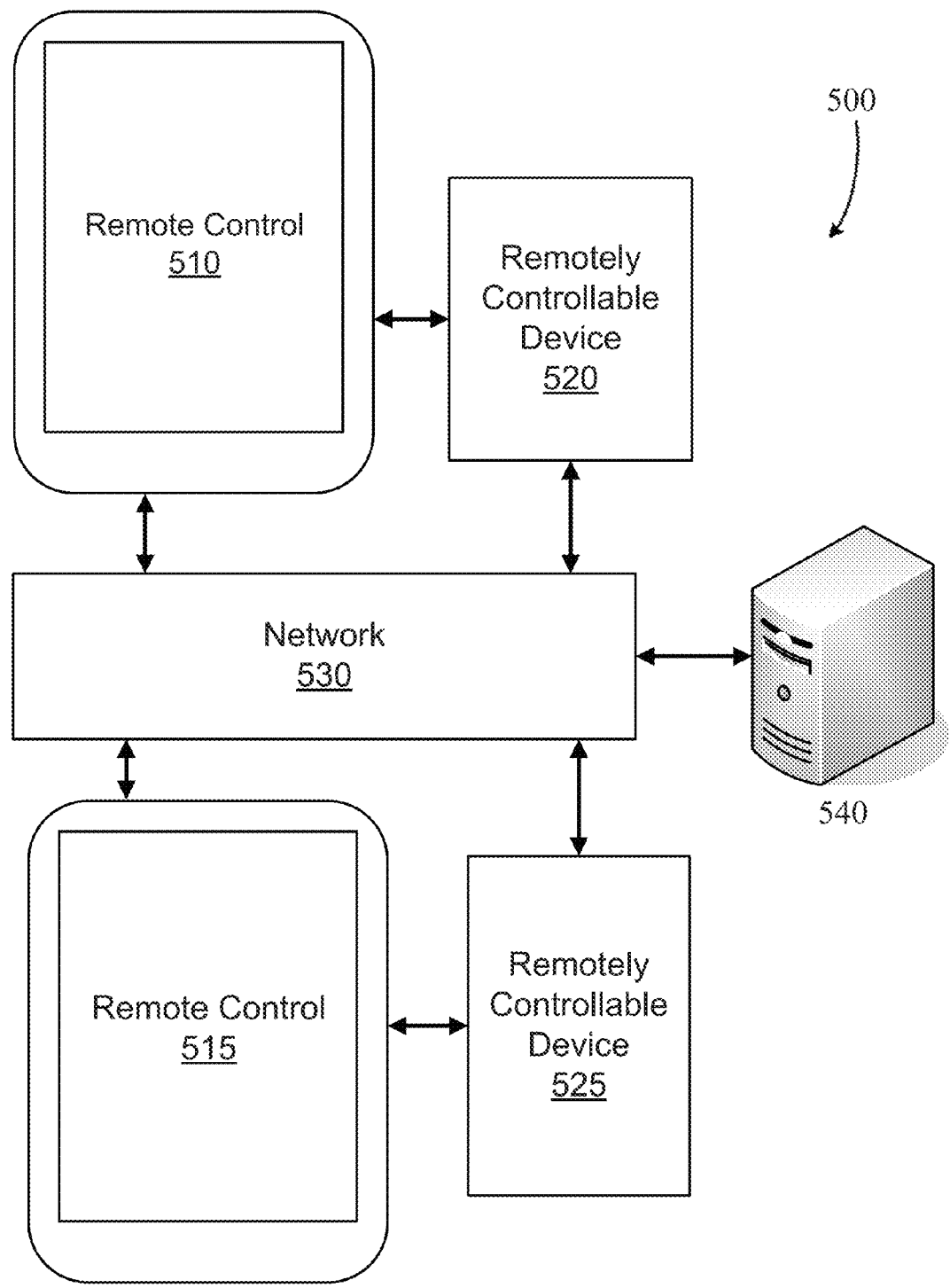
FIG. 5 illustrates a system depicting illustrative devices for haptic remote control gaming in an illustrative computing environment in accordance with an embodiment.

Referring now to FIG. 5, FIG. 5 illustrates a system 500 depicting remotely controllable devices 520, 525 and remote controls 510, 515 in accordance with an embodiment. The system 500 shown in FIG. 5 includes a first remotely controllable device 520, a second remotely controllable device 525, a first remote control 510, a second remote control 515, and a computer 540, though embodiments are not limited to only two remote controls and two remotely controllable devices.

A remote control, such as remote control 510 and/or remote control 515, can be any suitable device such as remote control 200 discussed herein with respect to FIG. 2. A remotely controllable device, such as remotely controllable device 520 and/or remotely controllable device 525, may be any suitable device such as remotely controllable device 300 discussed herein with respect to FIG. 3. In the embodiment shown in FIG. 5, the first remote control 510 is in communication with remotely controllable device 520 and the network 530, and the second remote control 515 is in communication with remotely controllable device 525 and the network 530. In some embodiments, the first remote control 510 is in communication with the second remote control 515, the first remotely controllable device 520, the second remotely controllable device 525, and/or computer 540 directly, such as by direct wired or wireless communication, and/or through the network 530. In some embodiments, the second remote control 515 is in communication with the first remote control 510, the first remotely controllable device 520 and/or the second remotely controllable device 525 directly and/or through the network 530. In other embodiments, remotely controllable device 520 is in communication with remotely controllable device 525 directly and/or through the network 530.

In the system 500 shown in FIG. 5, the computer 540 is connected to the network 530. In this embodiment, the computer 540 can perform coordination functions between remote control 510, remote control 515, remotely controllable device 520, and/or remotely controllable device 525. For example, the computer 540 may track the amount of damage that remotely controllable device 520 and/or remotely controllable device 525 has incurred. As another example, the computer 540 keep score of a game being played between a user of remote control 510 and a user of remote control 515. In embodiments, the computer 540 can transmit the amount of damage, scores, and/or other information regarding gameplay events, user information, status information, historical information from previous gameplay, etc. to remote control 510, remote control 515, remotely controllable device 520, and/or remotely controllable device 525. Computer 540 may be a general purpose computer or a specifically designed electronic device, such as a web server. In the embodiment shown in FIG. 5, computer 540 is a single computer. In other embodiments, computer 540 may be in communication with a plurality of other devices, such as a plurality of servers. In some embodiments, computer 540 is part of or in communication with a content distribution network (CDN). In other embodiments, system 500 may not include a computer 540. Numerous other embodiments are disclosed herein and variations are within the scope of this disclosure.

In embodiments, computer 540 maintains a virtual and/or augmented reality for one or more of the remote controls and/or remotely controllable devices. For example, the computer 540 may maintain an augmented reality by stitching together or otherwise combining information from various remote controls and/or remotely controllable devices into a single environment. In this embodiment, absolute movements of each device at their own location are translated into relative movements in the augmented reality and the remote controls are provided with information about its own remotely controllable device as well as other devices within the augmented reality. For example, at least a portion of the augmented reality can be displayed on a display of a remote control based at least in part on the information received from the computer 540. In embodiments, users of the remote controls can interact with each other through an augmented environment and/or a virtual environment. For example, users may be able to have car races or mock helicopter battles in various augmented environments. As another example, in one embodiment, projectile movement of a weapon is simulated by computer 540 when a user on a remote control presses a trigger button indicating that a weapon should be fired. In this embodiment, the projectile movement simulated by computer 540 may be displayed on a display of one or more of the remote controls. Numerous other embodiments are disclosed herein and variations are within the scope of this disclosure.

One or more remote controls may control or otherwise operate at least a portion of one or more remotely controllable devices. For example, in one embodiment, remote control 510 may control at least a portion of remotely controllable device 520 and/or remotely controllable device 525. In this embodiment, remote control 510 may cede control of at least a portion of one or more of the remotely controllable device 520, 525 to remote control 515. Thus, in embodiments, one remote control controls at least a portion of remotely controllable device 520 and another remote control controls another portion of remotely controllable device 525. In other embodiments, each remote control may control at least a portion of separate remotely controllable devices. For example, remote control 510 may control at least a portion of remotely controllable device 520 and remote control 515 may control at least a portion of remotely controllable device 525.

One or more remote controls may control or otherwise operate at least a portion of one or more remotely controllable devices. For example, in one embodiment, remote control 510 may control at least a portion of remotely controllable device 520 and/or remotely controllable device 525. In this embodiment, remote control 510 may cede control of at least a portion of one or more of the remotely controllable devices 520, 525 to remote control 515 in response to receiving a request from remote control 515, remotely controllable device 520, and/or remotely controllable device 525. In some embodiments, remote control 510 cedes control to remote control 515 in response to an event. For example, if a particular round in a game being played for a user of remote control 510 ends, then remote control 510 may cede control of remotely controllable device 520 and/or remotely controllable device 525 to remote control 515 such that a user of remote control 515 can play the game. As another example, if remotely controllable device 520 receives too much damage while being controlled by remote control 510, then control may be switched to remote control 515. In other embodiments, if remotely controllable device 520 is involved in a predetermined number of crashes within a predetermined period of time while being controlled by remote control 510, then remote control 510 cedes control of the remotely controllable device 520 to remote control 515. In another embodiment remote control 510 initially controls remotely controllable device 520 and remotely controllable device 525 and control is ceded to remote control 515 if communication between remote control 510 and remotely controllable device 525 is lost. Numerous other embodiments are disclosed herein and variations are within the scope of this disclosure.

In embodiments, two or more remote controls may control one or more remotely controllable devices at the same time. For example, remote control 510 may control the direction (e.g., forward, backward, left, right, etc.) of the remotely controllable device 520 while remote control 515 may control the speed of the remotely controllable device 520. As another example, remote control 510 may control the direction of the remotely controllable device 520 while remote control 515 controls the use of a real or a simulated weapon associated with the remotely controllable device 520. In some embodiments, additional remote controls may be used to control portions of a remotely controllable device. For example, a third remote control (not shown) may be used to control a camera associated with remotely controllable device 520. Thus, in embodiments, operation of one or more remotely controllable devices, such as remotely controllable device 520 and/or remotely controllable device 525, may be shared by two, three, four, or more remote controls.

Various types of information can be sent and/or received between one or more remote controls and one or more remotely controllable devices. For example, sensor information from remotely controllable device 520 and/or remotely controllable device 525 can be sent to remote control 510 and/or remote control 515. As another example, information such as a video and/or audio can be sent to remote control 510 and/or remote control 515. In some embodiments, information can be sent to and/from a remote control to one or more other remote controls and/or one or more remotely controllable devices. For example, information regarding the location of one remotely controllable device may be sent from the remotely controllable device and/or a remote control in communication with the remotely controllable device to other remote controls and/or other remotely controllable devices. In some embodiments, where one or more remote controls comprise or are in communication with a display, information received from one or more remote controls and/or one or more remotely controllable devices may be displayed on the display. For example, a location, speed, direction, temperature, video, other sensor information, etc. may be displayed on the display of a remote control.

In some embodiments, one or more graphical images are overlaid with information received from another device. For example, referring to FIG. 5, remote control 510 may display a location of remotely controllable device 520 and a location of remotely controllable device 525 based on information received from remotely controllable device 520 and from information received from remote control 515 that is in communication with remotely controllable device 525. In addition, video feeds from remotely controllable device 520 and/or remotely controllable device 525 may be sent to remote control 510 and/or remote control 515. In this embodiment, one or more graphics may be overlaid on one or more of the video feeds. For example, if the remotely controllable devices 520, 525 are RC cars, then remote control 510 and/or remote control 515 may overlay graphics on one or more video feeds from the RC car(s) to simulate racing at a race track. Numerous other examples of information that can be sent to and/or from remote controls and/or remotely controllable devices are disclosed herein and variations are within the scope of this disclosure.

In the embodiment shown in FIG. 5, remotely controllable device 520 wirelessly communicates with remote control 510 through a direct wireless connection. In other embodiments, one or more remote controls and/or remotely controllable devices may be in communication through one or more networks, such as network 530. Network 530 may be any suitable number or type of networks or links, including, but not limited to, a dial-in network, a local area network (LAN), wide area network (WAN), public switched telephone network (PSTN), a cellular network, a WiFi network, a satellite network, the Internet, an intranet or any combination of hardwired and/or wireless communication links. In one embodiment, the network is a single network. In other embodiments, the network 530 may comprise two or more networks. For example, the remote control 510 may be connected to a first network and remote control 515 may be connected to a second network and remotely controllable device 520 may be connected to the first network and the second network 525. In embodiments, remote controls, remotely controlled devices, and/or other devices may communicate with one or more networks over a wireless communications means using Radio Frequency (RF), Bluetooth, CDMA, TDMA, FDMA, GSM, WiFi, satellite, or other cellular or wireless technology. Numerous other network configurations would be obvious to a person of ordinary skill in the art.

In one embodiment, remotely controllable device 520 and remotely controllable device 525 are each helicopters. In this embodiment, remote control 510 controls remotely controllable device 520 and remote control 515 controls remotely controllable device 525. For example, remote control 510 may be able to control the driving of remotely controllable device 520 and remote control 515 can control the driving of remotely controllable device 525. As a user of remote control 510 and/or a user of remote control 515 interacts with their respective remote control to control the helicopters, remote control 510 and/or remote control 515 may output haptic effects to provide the user(s) with cues regarding various events. For example, if remotely controllable device 520 collides with remotely controllable device 525, then remote control 510 and/or remote control 515 may output a haptic effect to indicate that a crash has occurred. As another example, if remotely controllable device 520 is approaching remotely controllable device 525, then remote control 510 and/or remote control 515 may output a haptic effect to indicate that remotely controllable device 520 is approaching remotely controllable device 525.

In some embodiments, remotely controllable device 520 is physically in the same location as remotely controllable device 525. For example, remotely controllable device 520 and remotely controllable device 525 may both be flown in the same park or in the same yard. In this embodiment, various haptic effects, such as those discussed herein, are output in response to events within and/or interactions between remotely controllable device 520, remotely controllable device 525, and/or the outside environment. For example, a haptic effect may be output when remotely controllable device 520 physically crashes into remotely controllable device 525. As another example, a haptic effect may be output if both remotely controllable device 520 and remotely controllable device 525 physically are flown within a predetermined distance of each other.

In other embodiments, various haptic effects are output in response to events with and/or interactions between remotely controllable device 520, remotely controllable device 525, and/or an augmented environment. For example, a haptic effect may be output when remotely controllable device 520 and/or remotely controllable device 525 is flown above a certain altitude within the augmented environment regardless of the actual physical altitude that the remotely controllable device 520 and/or remotely controllable device 525 is actually flying. As another example, a haptic effect may be output when remotely controllable device 520 and remotely controllable device 525 crash into each other in the augmented environment regardless of whether an actual, physical crash between the devices 520, 525 occurs. In one embodiment, a haptic effect is output when remotely controllable device 520 crashes into a virtual object, such as a virtual rock, shown on a display of remote control 510 and/or remote control 515, regardless of whether remotely controllable device 520 physically crashes into an object in reality. As described herein, remote control 510, remote control 515, remotely controllable device 520, and/or remotely controllable device 525 can be used in a real environment, in a virtual reality environment, and/or in an augmented reality environment. Numerous other embodiments are disclosed herein and variations are within the scope of this disclosure.

In one embodiment, remotely controllable device 520 is a helicopter and comprises a gun and remotely controllable device 525 is a vehicle and comprises a gun. In this embodiment, remote control 510 controls the flying of the helicopter and another remote control (not shown) controls the gun of the helicopter. In addition, in this embodiment, remote control 515 controls the driving of the vehicle and another remote control (not shown) controls the gun of the vehicle. As users of the various remote controls interact with their respective remote control to control the helicopter, vehicle, and/or guns, haptic effects can be output by one or more of the remote controls to provide the user(s) cues regarding various events. For example, if a user of the remote control controlling the gun of the helicopter interacts with the remote control to fire the gun at the car, then a haptic effect may be output by remote control 510, remote control 515, and/or other remote controls to indicate that a shot has been fired. As another example, if the vehicle is hit by a bullet fired by the gun of the helicopter, then remote control 510, remote control 515, and/or other remote controls may output one or more haptic effects to indicate that the vehicle has been damaged. In one embodiment, if the helicopter is approaching the vehicle within a predetermined distance, then remote control 510, remote control 515, and/or other remote controls may output one or more haptic effects to indicate that the helicopter is approaching.

In some embodiments, the helicopter and the vehicle are both physically in the same location. For example, the helicopter and the vehicle may both physically be in the same park or in the same yard. In this embodiment, various haptic effects, such as those discussed herein, are output in response to events within and/or interactions between the helicopter, vehicle, and/or physical environment. For example, a haptic effect may be output if the helicopter crashes into the ground or if the vehicle overturns. As another example, a haptic effect can be output if the helicopter crashes into the vehicle. In one embodiment, a haptic effect is output if the helicopter and the vehicle come within a predetermined distance of each other. As another example, a haptic effect may be output if a bullet fired by a gun of the helicopter physically hits the vehicle.

In other embodiments, various haptic effects are output in response to events with and/or interactions between the helicopter, the vehicle, and/or an augmented environment. For example, the helicopter and the vehicle may be physically operated in the same or in different locations. Information from these devices can be received by remote control 510, remote control 515 and/or other remote controls and combined or otherwise incorporated into a virtual environment to create an augmented environment. For example, movements of the helicopter and/or the vehicle can be received by the remote controls and incorporated into an augmented environment. Thus, if a remote control is operated to fly the helicopter to the right in a physical environment, then the helicopter can flown to the right in an augmented environment by updating a display of a remote control to reflect that the helicopter is moving to the right in the augmented environment.

Various haptic effects, such as those discussed herein, may be output in response to events within and/or interactions between the helicopter, vehicle, physical environment, and/or augmented environment. For example, a haptic effect may be output if the helicopter crashes into the ground in the augmented environment regardless of whether the helicopter physically crashes into the ground in the physical environment. In one embodiment, a haptic effect is output if the helicopter physically crashes into an object in the physical environment regardless of whether the helicopter crashes into an object in the augmented environment. As another example, a haptic effect can be output if the helicopter and the vehicle come within a predetermined distance of each other in the augmented environment regardless of the actual physical distance between the helicopter and the vehicle in reality. In one embodiment, a haptic effect is output if a virtual or real bullet fired by the helicopter hits the vehicle in an augmented reality environment. As described herein, remote control 510, remote control 515, remotely controllable device 520, remotely controllable device 525, other remote control(s), other remotely controllable device(s), other devices, or a combination thereof, can be used in a real environment, in a virtual environment, and/or in an augmented reality environment. Numerous other embodiments are disclosed herein and variations are within the scope of this disclosure.

In embodiments, remotely controllable device 520 and remotely controllable device 525 are in a same location, such as in a same building, in a same park, on the same road, etc. In other embodiments, remotely controllable device 520 and remotely controllable device 525 are in different physical locations. For example, remotely controllable device 520 may be located indoors and remotely controllable device 525 may be located outdoors. As another example, remotely controllable device 520 may be located in one city and remotely controllable device 520 may be located in another city. In some embodiments, remote control 510 and remote control 515 are in a same location, such as in a same building, in a same park, etc. In other embodiments, remote control 510 and remote control 515 are in different physical locations. For example, remote control 510 may be located indoors and remotely control 515 may be located outdoors. As another example, remote control 510 may be located in one city and remote control 515 may be located in another city. Numerous other embodiments are disclosed herein and variations are within the scope of this disclosure.

Illustrative Method of Generating Haptic Effects

Figure 6:
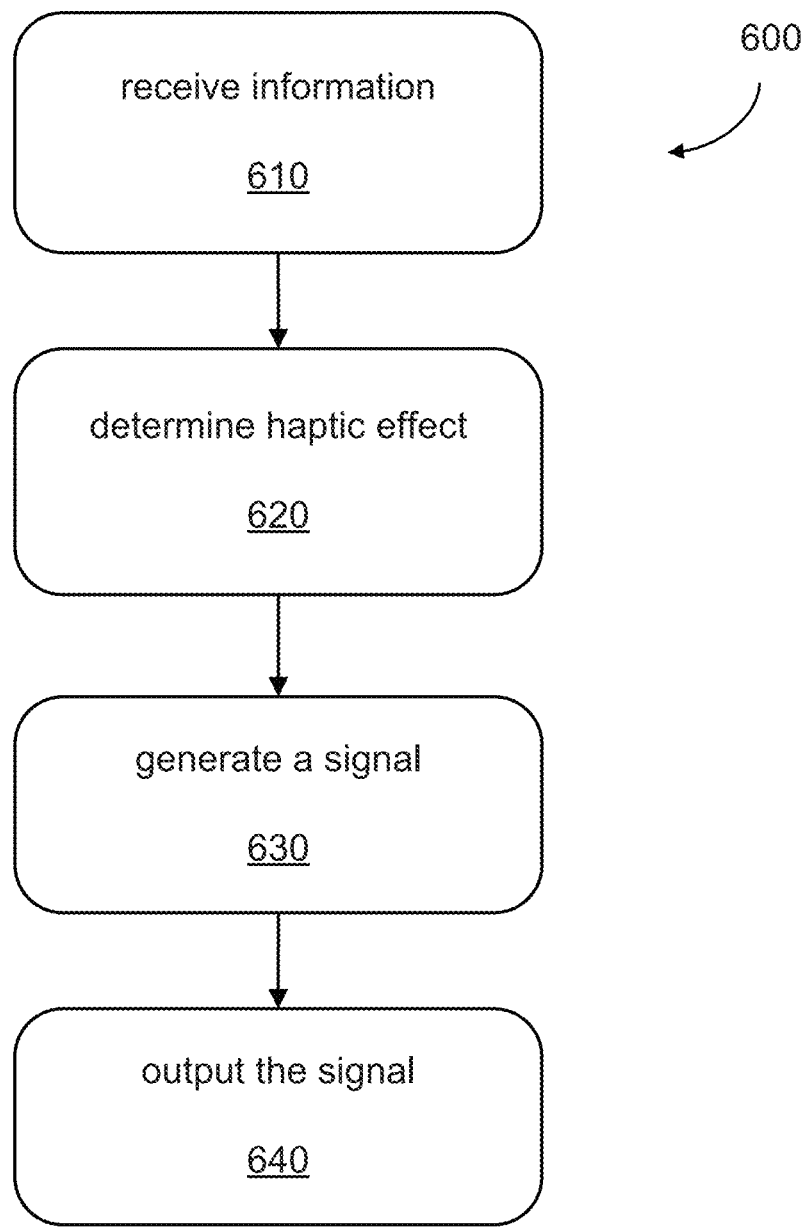
FIG. 6 illustrates a flow chart directed to a method of generating haptic effects in accordance with an embodiment.

Referring now to FIG. 6, this figure illustrates a flow chart directed to a method 600 of generating haptic effects in accordance with an embodiment. The method 600 shown in FIG. 6 will be described with respect to the remote control 200 shown in FIG. 2 and the remotely controllable device 300 shown in FIG. 3. In embodiments, the method 600 can be performed by one or more of the devices shown in system 100 in FIG. 1, system 400 in FIG. 4, and/or system 500 in FIG. 5. However, the method 600 shown in FIG. 6 will be described with respect to system 500 shown in FIG. 5. In addition, aspects of method 600 will be described with respect to remote control 200 shown in FIG. 2; however, other devices such as remotely controllable device 300 shown in FIG. 3 may perform these functions in various embodiments.

The method 600 begins in block 610 when a remote control and/or a remotely controllable device receives information from another remote control and/or another remotely controllable device. In one embodiment, referring to FIG. 5, remote control 510 receives sensor information indicating a speed and direction of remotely controllable device 520 from remotely controllable device 520. Information may be sent to remote control 510 in response to a request for the information sent by remote control 510 to remotely controllable device 520. In another embodiment, the information may be pushed from remotely controllable device 520 to remote control 510. For example, remotely controllable device 520 may send information to remote control 510 without remote control 510 requesting the information. In other embodiments, remote control 510 may receive information directly or through one or more networks, such as network 530, from remote control 515, remotely controllable device 525, other remote controls, other remotely controllable devices, other electronic devices, or a combination thereof.

The information received by a remote control 200 and/or a remotely controllable device 300 can include information associated with one or more accelerometers, gyroscopes, digital compasses, sensors usable to determine location, pressure, speed, wind speed, temperature, force and/or size, resistive panels, capacitive panels, infrared LEDs, photodetectors, image sensors, optical cameras, other cameras, microphones, speakers. The information can be received by an application, an applet, a plug-in, or a script being executed by a processor on remote control 200 and/or remotely controllable device 300. Numerous other embodiments are disclosed herein and variations are within the scope of this disclosure.

Referring back to method 600, once the remote control and/or remotely controllable device has received the information 610, the method 600 proceeds to block 620. In block 620, the remote control and/or the remotely controllable device determines one or more haptic effects 620. For example, in an embodiment, remote control 510 receives sensor information indicating a speed and direction of remotely controllable device 520 from remotely controllable device 520. In this embodiment, remote control 510 determines a haptic effect based at least in part on the received speed and/or the direction. For example, remote control 510 may determine based at least in part on the speed and direction that the remotely controllable device 520 is approaching an object. In this embodiment, the remote control 510 determines a haptic effect configured to warn a user of the remote control that the remotely controllable device 520 is approaching an object.

One or more haptic effects may be determined by a remote control 200 and/or a remotely controllable device 300 in any number of ways. In one embodiment, one or more haptic effects are determined by a remote control 200 based at least in part on information received from a remotely controllable device 300. For example, remote control 200 may determine a haptic effect when sensor information received from a remotely controllable device 300 indicates that the remotely controllable device 300 is approaching an object. As another example, remote control 200 may determine a haptic effect when sensor information received from a remotely controllable device 300 indicates that the remotely controllable device 300 has collided with another object. In some embodiments, remote control 200 determines a haptic effect based at least in part on state information associated with a remotely controllable device 300. For example, if the remote control 200 receives information from the remotely controllable device 300 that indicates that an engine associated with the remotely controllable device 300 has stalled, then the remote control 200 may determine a haptic effect configured to indicate to a user of the remote control 200 that the engine of the remotely controllable device 300 has stalled. In embodiments, a haptic effect may be determined by remote control 200 based at least in part on augmented reality. For example, if the remotely controllable device 300 is a remote control car, then the remote control 200 may display a virtual race track and the remote control car on a display associated with the remote control 200. In this embodiment, if the remote control car collides with a virtual car in the augmented reality environment, then the remote control 200 determines a haptic effect configured to indicate that a collision has occurred. As another example, the remote control 200 may determine a haptic effect as the remote control car approaches a virtual car on the race track. Numerous other embodiments are disclosed herein and variations are within the scope of this disclosure.

In some embodiments, one or more haptic effects are determined based at least in part on information from another remote control. For example, a first remote control 200 may control the driving a remotely controllable device 300 and a second remote control 200 may control a camera associated with the remotely controllable device 300. Thus, in embodiments, operational control of a remotely controllable device 300 may be shared between two, three, four, or more remote controls. In this embodiment, one or more haptic effects may be determined by the first remote control based at least in part on the second remote control. For example, the first remote control may receive a request from the second remote control and/or the remotely controllable device 300 to cede control of at least a portion of the operation to the second remote control. In this embodiment, the first remote control may determine a haptic effect indicating that at least partial control of the remotely controllable device 300 is being ceded to the second remote control. For example, in one embodiment, a first controller cedes control to a second controller based on the remotely controllable device being out of range of the first controller but still in range of the second controller. As another example, a first controller may cede control to a second controller in response to a user selecting a button to switch controllers. In one embodiment, the second remote control may determine a haptic effect configured to indicate a collision when a user of the first remote control drives the remotely controllable device 300 into a real or virtual object.

In some embodiments, one or more haptic effects are determined based at least in part on interactions between two or more remote controls and/or two or more remotely controllable devices. For example, referring to FIG. 5, a first remote control 510 may operate remotely controllable device 520 in a first location and a second remote control 515 may operate remotely controllable device 525 in a second location. The second location may be remote from the first location. In this embodiment, communication between remote control 510 and remotely controllable device 520 may occur directly while communication between remote control 510 and remote control 515 occurs through network 530. In this embodiment, remote control 510 may determine one or more haptic effects based at least in part on information from remotely controllable device 520 and/or remotely controllable device 525. For example, remote control 510 may determine a haptic effect indicating a collision when remotely controllable device 520 collides with remotely controllable device 525 in an augmented reality view displayed on a display of the remote control 510. As another example, remote control 510 may determine a haptic effect configured to indicate that a weapon has been fired when a user of remote control 520 provides input to remote control 520 indicating that a weapon of remotely controllable device 525 should be fired. Numerous other embodiments of when and how haptic effects may be determined are disclosed herein, such as with respect to system 100, system 400, and/or system 500, and variations are within the scope of this disclosure.

In embodiments, one or more haptic effects may be based at least in part on information received from a remote control 200, such as the various information described above with respect to FIG. 2, and/or information received from a remotely controllable device 300, such as the various information described herein with respect to FIG. 3. Numerous other embodiments are disclosed herein and variations are within the scope of this disclosure.

Referring back to method 600, once the remote control and/or the remotely controllable device determines one or more haptic effects 620, the method 600 proceeds to block 630. In block 630, a signal is generated. For example, in an embodiment where an event involves a collision between a remotely controllable device and another object—such as the ground, a rock, a building, another remotely controllable device, etc.—then a signal may be generated when the collision between the remotely controllable device and the object occurs. In one embodiment, a collision physically occurs. For example, a remotely controllable device may physically contact a rock on the ground. As another example, a remotely controllable device may physically contact another remotely controllable device. In some embodiments, a collision occurs in augmented reality. For example, a collision may occur when a remotely controllable device contacts an augmented rock being displayed on a display of the remote control. As another example, a collision may occur when a remotely controllable device virtually contacts another remotely controllable device. In one embodiment, a remotely controllable device is struck by a gunshot from another remotely controlled device. The gunshot may be from a real, physical bullet or from a virtual bullet. In this embodiment, haptic effect may be determined and a signal generated to indicate that a remotely controllable device has been hit. Thus, in various embodiments, interactions between multiple remotely controllable devices can be detected by a remotely controllable device. The interactions can be reported to one or more remote controls by a remotely controllable device.

A remotely controllable device may be in communication with one, two, three, or more remote controls. In such embodiments, a remotely controllable device may be controlled by one, two, three, or more remote controls. In some embodiments, one or more haptic effects are determined based at least in part on environmental feedback from one or more of the remotely controllable toys, gameplay events from one or more remote controls, gameplay events from one or more interactions between one or more of the remotely controllable devices, or a combination thereof. Any determined haptic effect(s) may be output to any number of remote controls, remotely controllable devices, other devices, or a combination thereof.

Multiple remotely controllable devices and/or remote controls may be in communication with each other over one or more networks. In such embodiments, one or more haptic effects may be determined based at least in part on multiplayer interactions between the remotely controllable devices and/or the remote controls. For example, if sensor information received from one remotely controllable device indicates that a collision has occurred, then one or more of remote controls may output a haptic effect configured to indicate that a collision has occurred.

In one embodiment, a remote control comprises a display and a remotely controllable device comprises a camera. In such an embodiment, the remote control can display information from one or more of the remotely controllable devices. For example, at least a portion of one or more video feeds from one or more remotely controllable devices may be displayed on a display of a remote control. A video feed from one or more remotely controllable devices can be overlaid with other graphical images and displayed on the display of the remote control. Thus, in embodiments, an augmented reality using information received from one or more remotely controllable devices and/or one or more remote controls is displayed on a display of a remote control. In addition, haptic effects can be determined based at least in part on the augmented reality, environmental feedback, gameplay events, state information of one or more devices, other information, or a combination thereof. Any determined haptic effect(s) may be output to any number of remote controls, remotely controllable devices, other devices, or a combination thereof. Numerous other embodiments are disclosed herein and variations are within the scope of this disclosure.

In an embodiment, a signal is generated the first time an event occurs. For example, if the event comprises a collision between a remotely controllable device and an object, then the first time that a collision between the remotely controllable device and the object occurs, the processor 210 generates a signal. In one embodiment, if a subsequent collision occurs and/or if a subsequent collision occurs within a predetermined period of time between the remotely controllable device and the object, then another signal is not generated. In other embodiments, if a subsequent collision occurs between the remotely controllable device and the object, then the processor 210 generates a signal based on the subsequent collision.

In one embodiment, a signal is generated each time an event occurs. Thus, referring to the example above, each time a collision occurs between the remotely controllable device and the object, the processor 210 generates a signal. Therefore, if the remotely controllable device collides with a rock and then collides again with the rock for a second time, then the processor 210 would generate a signal twice. In another embodiment, a signal is generated only the first time the event occurs.

In embodiments, one or more signals are generated at any number of times based at least in part on information received from a remotely controllable device, a remote control, user input, other devices, or a combination thereof. The information can include environmental information such as a temperature, wind speed, terrain conditions (e.g., water, mud, dry land, mountains, hills, etc.), information regarding the state of a device, information regarding the proximity of a device to another device, information regarding events of one or more users of one or more remote controls, information regarding events initiated by a user's own interaction with a remote control, information regarding events received from another remote control being operated by a second user, other suitable information, or a combination thereof. Information can be information corresponding to real life conditions such as an actual temperature and/or information corresponding to virtual conditions such as a remotely controllable device colliding with a virtual rock. In one embodiment, one or more signals are generated when an event occurs. In some embodiments, one or more signals are generated prior to an event occurring. In other embodiments, one or more signals are generated after an event occurs. Numerous other embodiments are disclosed herein and variations are within the scope of this disclosure.

In some embodiments, the processor 210 generates a single signal when the event occurs. For example, in one embodiment, the processor 210 generates a signal configured to cause a haptic output device, such as haptic output device 240 or haptic output device 260, to output a haptic effect. The haptic effect may indicate that an object is currently displayed on the display 230, that an object is about to be displayed on the display 230, that an object is approaching, that an event has occurred, that an event is about to occur, or a combination thereof.

In other embodiments, the processor 210 generates two, three, or more signals. For example, in one embodiment, the processor 210 generates a first signal configured to cause a first haptic effect and a second signal configured to cause a second haptic effect. In some embodiments, the processor 210 generates a different signal for each event that occurs. In various embodiments, the processor 210 generates one or more signals configured to cause the touch-sensitive display 230, the communication interface 250, the haptic output device 240, the haptic output device 260, the speaker 270, other components of the device 200, other components of devices in communication with the device 200, or a combination thereof to output one or more of the generated signals, such as a video signal, audio signal, haptic output signal, and/or a communication signal. For example, in one embodiment, the processor 210 generates a signal when the event occurs where the signal is configured to cause a haptic output device in another device to cause a haptic effect. In one embodiment, the processor 210 sends the signal to the other device through the communication interface 250.

In one embodiment, a generated signal includes a command for a device or component to perform a specified function, such as to output a haptic effect or transmit a message to a remote device. In another embodiment, a generated signal includes parameters which are used by a device or component receiving the command to determine a response or some aspect of a response. Parameters may include various data related to, for example, magnitudes, frequencies, durations, or other parameters that a haptic output device can use to determine a haptic effect, output a haptic effect, or both. For example, in one embodiment, the processor 210 generates a signal configured to cause haptic output device 240 to output a haptic effect. In such an embodiment, the signal may include a pressure parameter that the haptic output device 240 uses to determine the intensity of the haptic effect to output. For example, according to one embodiment, the larger the pressure parameter the haptic output device 240 receives, the more intense the haptic effect that is output.

In one embodiment, an intensity parameter is used by a haptic output device to determine the intensity of a haptic effect. In this embodiment, the greater the intensity parameter, the more intense the haptic effect that is output. In one embodiment, the intensity parameter is based at least in part on sensor information, such as speed, direction, etc., of a remotely controllable device when an event occurs. Thus, according to one embodiment, a larger intensity parameter is sent to a haptic output device when an event occurs while the remotely controllable device is travelling at a faster speed than when an event occurs while the remotely controllable device is travelling at a slower speed. A signal may include data that is configured to be processed by a haptic output device, display, communication interface, speaker, or other components of a device or in communication with a device in order to determine an aspect of a particular response.

It will be recognized that any type of input synthesis method may be used to generate the interaction parameter for one or more haptic effect signals including, but not limited to, the method of synthesis examples listed in TABLE 1 below. A drive signal may be applied to a haptic actuator according to the interaction parameter. Numerous other embodiments are disclosed herein and variations are within the scope of this disclosure.

Referring again to FIG. 6, once a signal has been generated as specified in block 630, the next step of method 600 is to output the signal as shown in block 640. For example, in one embodiment, the processor 210 generated a first signal configured to cause haptic output device 240 to output a haptic effect. In such an embodiment, the processor 210 outputs the signal to haptic output device 240. As another example, in an embodiment, the processor 210 generated a first haptic output signal configured to cause haptic output device 240 to output a first haptic effect and generated a second haptic output signal configured to cause haptic output device 260 to output a second haptic effect. In this embodiment, the processor 210 outputs the first haptic output signal to haptic output device 240 and the second haptic output signal to haptic output device 260.

In various embodiments, the processor 210 may output one or more generated signals to any number of devices. For example, the processor 210 may output one signal to the communication interface 250. In one embodiment, the processor 210 may output one generated signal to the touch-sensitive display 230, another generated signal to the communication interface 250, and another generated signal to the haptic output device 260. In other embodiments, the processor 210 may output a single generated signal to multiple components or devices. For example, in one embodiment, the processor 210 outputs one generated signal to both haptic output device 240 and haptic output device 260. In another embodiment, the processor 210 outputs one generated signal to haptic output device 240, haptic output device 260, and communication interface 250. In still another embodiment, the processor 210 outputs one generated signal to both haptic output device 240 and haptic output device 260 and outputs a second generated signal to the touch-sensitive display 230.

As discussed above, the processor 210 may output one or more signals to the communication interface 250. For example, the processor 210 may output a signal to the communication interface 250 instructing the communication interface 250 to send data to another component or device in communication with the device 200. In such an embodiment, the communication interface 250 may send data to the other device and the other device may perform a function such as updating a display associated with the other device or the other device may output a haptic effect. Thus, in embodiments, a second device may output a haptic effect based at least in part upon an interaction with a first device in communication with the second device. In other embodiments, a second device may perform any number of functions such as, for example, updating a display associated with the second device or outputting a sound to a speaker associated with the second device based at least in part on an interaction with a first remote control 200.

In various embodiments, after the processor 210 outputs a signal to a component, the component may send the processor 210 a confirmation indicating that the component received the signal. For example, in one embodiment, haptic output device 260 may receive a command from the processor 210 to output a haptic effect. Once haptic output device 260 receives the command, the haptic output device 260 may send a confirmation response to the processor 210 that the command was received by the haptic output device 260. In another embodiment, the processor 210 may receive completion data indicating that a component not only received an instruction but that the component has performed a response. For example, in one embodiment, haptic output device 240 may receive various parameters from the processor 210. Based on these parameters haptic output device 240 may output a haptic effect and send the processor 210 completion data indicating that haptic output device 240 received the parameters and outputted a haptic effect.

It will be recognized that any type of input synthesis method may be used to generate the interaction parameter for one or more haptic effect signals including, but not limited to, the method of synthesis examples listed in TABLE 1 below. A drive signal may be applied to a haptic actuator according to the interaction parameter. Numerous other embodiments are disclosed herein and variations are within the scope of this disclosure.

TABLE 1

METHODS OF SYNTHESIS

| | |
|---|---|
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

Illustrative Method of Generating Haptic Effects

Figure 7:
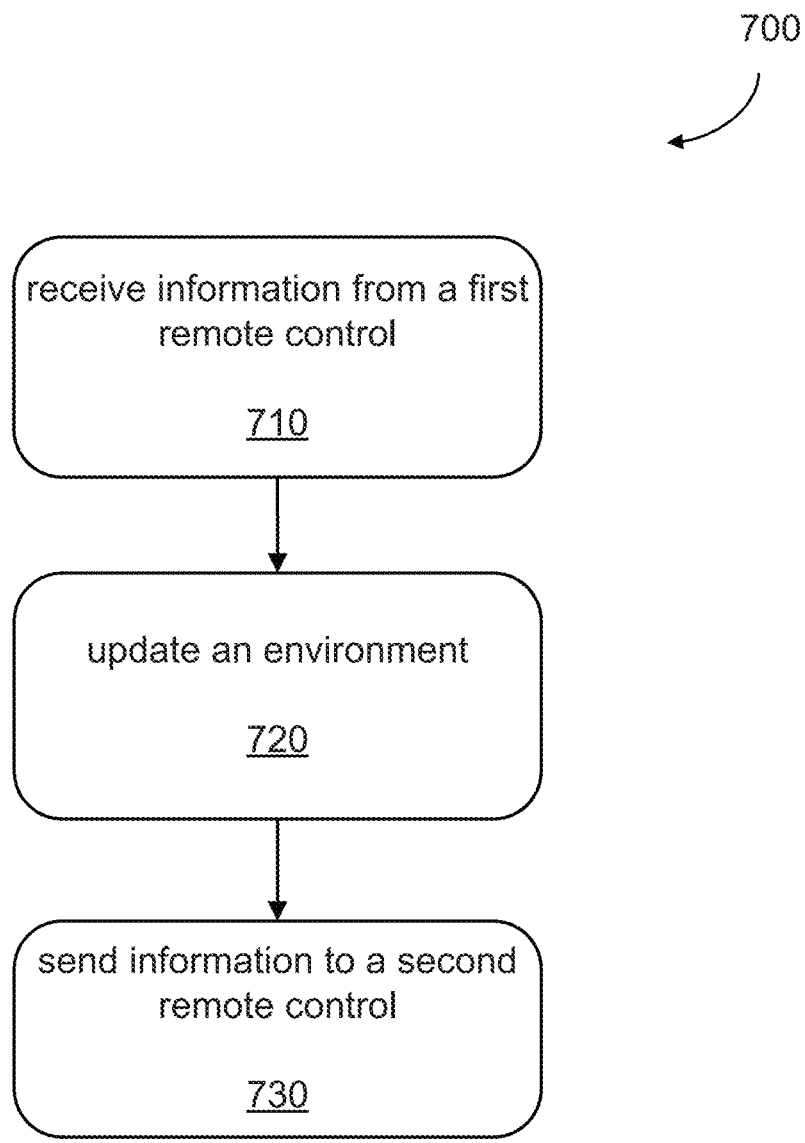
FIG. 7 illustrates a flow chart directed to a method of generating haptic effects in accordance with an embodiment.

Referring now to FIG. 7, this figure illustrates a flow chart directed to a method 700 of generating haptic effects in accordance with an embodiment. The method 700 shown in FIG. 6 will be described with respect to the remote control 200 shown in FIG. 2 and the remotely controllable device 300 shown in FIG. 3. In embodiments, the method 700 can be performed by one or more of the devices shown in system 100 in FIG. 1, system 400 in FIG. 4, and/or system 500 in FIG. 5. However, the method 700 shown in FIG. 7 will be described with respect to system 500 shown in FIG. 5. In addition, aspects of method 700 will be described with respect to remote control 200 shown in FIG. 2; however, other devices such as remotely controllable device 300 shown in FIG. 3 may perform these functions in various embodiments.

The method 700 begins in block 710 when information is received from a first remote control. For example, referring to FIG. 5, computer 540 may receive information from remote control 510 through network 530. In one embodiment, a user operates remote control 510 in a manner that causes an action to occur in remotely controllable device 520. For example, the user may press a button on the remote control 510 to fire a weapon on remotely controllable device 520. As another example, the user may use the remote control 510 to drive remotely controllable device 520. In embodiments, an action may occur, for example, when remotely controllable device moves, approaches another object, collides with another object, an input and/or output device of the remotely controllable device is moved or fired. Numerous other embodiments are disclosed herein and variations are within the scope of this disclosure.

In embodiments, when an action occurs in remotely controllable device 520, remote control 510 sends information to computer 540 directly and/or through network 530. For example, remote control 510 can send information regarding the action to computer 540. Thus, in one embodiment, as remotely controllable device 520 is driven or otherwise operated by a user using remote control 510, the remote control 510 sends information regarding the movements to computer 540. Remote control 510 can send sensor information received from remotely controllable device 520 to computer 540. For example, remote control 510 may receive sensor information from remotely controllable device 520 indicating that the remotely controllable device has collided with another object and at least a portion of the sensor information may be sent by remote control 510 to computer 540. In embodiments, computer 540 receives the sensor information and/or action information from remote control 510 through network 530. Numerous other embodiments are disclosed herein and variations are within the scope of this disclosure.

Referring back to method 700, once the information has been received from the first remote control 710, the method proceeds to block 720. In block 720, an environment is updated. For example, referring to FIG. 5, if computer 540 receives information from remote control 510 through network 530, then computer 540 may update an environment based at least in part on the received information. In one embodiment, the environment is an augmented reality environment maintained by computer 540. For example, computer 540 may maintain an augmented reality by stitching together or otherwise combining information receiving from various remote controls, such as remote control 510 and remote control 515, to create a single environment. In embodiments, at least a portion of the information received from the various remote controls is overlaid with one or more graphical objects, videos, or other virtual environment to create a single, augmented environment. Thus, in an embodiment, as actions and/or sensor information from remote control 510 and/or remote control 515 is received by computer 540, the augmented reality environment maintained by computer 540 is updated. For example, as a user interacts with remote control 510 to control absolute movements of remotely controllable device 520, action information and/or sensor information can be sent to computer 540 and used by computer 540 to update the augmented reality environment by translating the absolute movements into relative movements in the augmented reality environment. Numerous other embodiments are disclosed herein and variations are within the scope of this disclosure.

Referring back to method 700, once the environment has been updated 720, the method 700 proceeds to block 730. In block 730, information is sent to a second remote control. For example, referring to FIG. 5, computer 540 may send information to remote control 515 through network 530. In one embodiment, the information sent by computer 540 to remote control 515 is sensor information and/or action information that the computer 540 received from remote control 510. In another embodiment, the information sent by computer 540 to remote control 515 is information usable to update a display associated with remote control 515 so that it reflects at least a portion of the updated augmented reality of the computer 540. For example, if computer 540 receives information from remote control 510 indicating a wheel of remotely controllable device 520 has come off, then computer 540 may update the augmented reality environment to indicate that the wheel of remotely controllable device 520 has come off and computer 540 can send information to remote control 515 can be used to update a display of remote control 515 to show a user that remotely controllable device 520 no longer has a wheel.

As another example, if computer 540 receives information from remote control 510 indicating that a gun or other weapon is disabled, then computer 540 may update the augmented reality environment to reflect that the gun has been disabled and computer 540 may send status information to remote control 515 indicating that the gun has been disabled. In this embodiment, a display of remote control 515 may be updated to reflect that the gun has been disabled. For example, an "X" may be overlaid over the gun that has been disabled and displayed on the display. Numerous other embodiments are disclosed herein and variations are within the scope of this disclosure.

General

While the methods and systems herein are described in terms of software executing on various machines, the methods and systems may also be implemented as specifically-configured hardware, such as field-programmable gate array (FPGA) specifically to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A non-transitory computer-readable medium comprising one or more software applications configured to be executed by a processor in a first portable multifunction device, the one or more software applications configured to:
   receive, by the first portable multifunction device, information from a remotely device, the first portable multifunction device configured to remotely control a remotely controllable device;
   cede, by the first portable multifunction device, a control function to a second portable multifunction device based at least in part on the received information, wherein the control function is configured to control a function of the remotely controllable device, and wherein the remote device is at least one of the remotely controllable device or the second portable multifunction device;
   determine, by the first portable multifunction device, a first haptic effect configured to indicate that the control function has been ceded to the second portable multifunction device;
   generate, by the first portable multifunction device, a signal configured to cause a haptic output device to output the first haptic effect; and
   output, by the first portable multifunction device, the signal to the haptic output device.

2. The non-transitory computer-readable medium of claim 1, wherein the first portable multifunction device is a smartphone.

3. The non-transitory computer-readable medium of claim 2, wherein the second portable multifunction device is a watch.

4. The non-transitory computer-readable medium of claim 1, wherein the first portable multifunction device is a watch.

5. The non-transitory computer-readable medium of claim 1, wherein the remotely controllable device comprises at least one of a car, a plane, a drone, a robot, or a doll.

6. The non-transitory computer-readable medium of claim 1, wherein the information is received from at least one of the remotely controllable device or the second portable multifunction device over at least one radio frequency.

7. The non-transitory computer-readable medium of claim 1, wherein the information is received from at least one of the remotely controllable device or the second portable multifunction device via at least one of a cellular network or a Wi-Fi network.

8. The non-transitory computer-readable medium of claim 1, wherein the information comprises sensor information associated with one or more sensors in the remotely controllable device.

9. The non-transitory computer-readable medium of claim 8, wherein the sensor information comprises at least one of a direction, a tilt, or a speed of the remotely controllable device.

10. The non-transitory computer-readable medium of claim 1, wherein the signal is output to the haptic output device and the first portable multifunction device comprises the haptic output device.

11. The non-transitory computer-readable medium of claim 1, wherein the information comprises a video feed from at least one camera associated with the remotely controllable device.

12. The non-transitory computer-readable medium of claim 11, wherein the one or more software applications is further configured to:
   overlay at least a portion of the video feed and one or more graphical images to create an overlaid view; and
   display the overlaid view on a display of the first portable multifunction device.

13. The non-transitory computer-readable medium of claim 1, wherein the received information comprises environmental information for the remotely controllable device.

14. The non-transitory computer-readable medium of claim 1, wherein a first portion of the information is received by the first portable multifunction device from the remotely controllable device and a second portion of the information is received by the first portable multifunction device from the second portable multifunction device.

15. The non-transitory computer-readable medium of claim 14,
   wherein the first portion of the information received from the remotely controllable device comprises environmental information for the remotely controllable device,
   wherein the second portion of the information received from the second portable multifunction device comprises an event performed by the second portable multifunction device, and
   wherein the determined first haptic effect is based at least in part on the environmental information received from the remotely controllable device and the event received from the second portable multifunction device.

16. The non-transitory computer-readable medium of claim 1, wherein the received information comprises information usable to determine an event associated with the remotely controllable device.

17. The non-transitory computer-readable medium of claim 16, wherein the event occurs in an augmented reality.

18. The non-transitory computer-readable medium of claim 1, wherein the second portable multifunction device is operable as a second remote control for a second remotely controllable device, and wherein the information corresponds to the second remotely controllable device.

19. The non-transitory computer-readable medium of claim 18,
wherein the first portable multifunction device is in a first location,
wherein the second portable multifunction device is in a second location,
wherein the first location is different from the second location, and
wherein the first portable multifunction device in the first location is configured to communicate with the second portable multifunction device in the second location through at least one network.

20. The non-transitory computer-readable medium of claim 18,
wherein the information is received in response to an event corresponding to the second remotely controllable device that occurred in an augmented reality during gameplay, and
wherein the determined first haptic effect is based at least in part on the event.

21. The non-transitory computer-readable medium of claim 1, wherein the signal is output to the second portable multifunction device.

22. The non-transitory computer-readable medium of claim 1, wherein the signal is output to the remotely controllable device.

23. The non-transitory computer-readable medium of claim 1, wherein the control function is ceded by the first portable multifunction device to the second portable multifunction device in response to a request from the second portable multifunction device in the received information.

24. The non-transitory computer-readable medium of claim 1, wherein the control function is ceded by the first portable multifunction device to the second portable multifunction device in response to a damage determination corresponding to the remotely controllable device based at least in part on the received information.

25. The non-transitory computer-readable medium of claim 1, wherein the control function is ceded by the first portable multifunction device to the second portable multifunction device in response to a determination that communication with the remotely controllable device is lost.

26. The non-transitory computer-readable medium of claim 1, wherein the second portable multifunction device obtains exclusive control over the control function after the first portable multifunction device cedes the control function to the second portable multifunction device.

27. A method comprising:
receiving, by a first portable multifunction device, information from a remote device, the first portable multifunction device configured to remotely control a remotely controllable device;
ceding, by the first portable multifunction device, a control function to a second portable multifunction device based at least in part on the received information, wherein the control function is configured to control a function of the remotely controllable device, and wherein the remote device is at least one of the remotely controllable device or the second portable multifunction device;
determining, by the first portable multifunction device, a first haptic effect configured to indicate transfer of the control function to the second portable multifunction device;
generating, by the first portable multifunction device, a signal configured to cause an actuator to output the first haptic effect; and
outputting, by the first portable multifunction device, the signal.

28. A system, comprising:
a first remotely controllable device, comprising:
a first memory, a first communication interface, a first sensor, and a first processor in communication with the first memory, the first communication interface, and the first sensor; and,
a second portable multifunction device, comprising:
a second display, a second memory, a second communication interface, a second haptic output device, and a second processor in communication with the second display, the second memory, the second communication interface, and the second haptic output device; and
a third portable multifunction device, comprising:
a third display, a third memory, a third communication interface, a third haptic output device, and a third processor in communication with the third display, the third memory, the third communication interface, and the third haptic output device,
wherein the second portable multifunction device is configured to:
receive information from at least one of the remotely controllable device or the third portable multifunction device in response to sensor information received from the first sensor;
cede a control function to the third portable multifunction device based at least in part on the received information, wherein the control function is configured to control a function of the first remotely controllable device;
determine a first haptic effect configured to indicate transfer of the control function to the third portable multifunction device;
generate a haptic output signal based on the first haptic effect; and
output the haptic output signal to at least one of the second haptic output device, the first remotely controllable device, or the third portable multifunction device, and
wherein, after ceding the control function, the second portable multifunction device and the third portable multifunction device are configured to remotely control the first remotely controllable device.

* * * * *